United States Patent [19]

Sakamoto et al.

[11] Patent Number: 5,001,573
[45] Date of Patent: Mar. 19, 1991

[54] METHOD OF AND APPARATUS FOR PERFORMING DETAIL ENHANCEMENT

[75] Inventors: Takashi Sakamoto; Makoto Hirosawa, both of Kyoto, Japan

[73] Assignee: Dainippon Screen Mfg. Co., Ltd., Kyoto, Japan

[21] Appl. No.: 430,459

[22] Filed: Nov. 2, 1989

[30] Foreign Application Priority Data

Nov. 7, 1988 [JP] Japan .................. 63-281008

[51] Int. Cl.$^5$ .............................................. H04N 1/40
[52] U.S. Cl. ................................ 358/447; 358/461; 358/463
[58] Field of Search ............... 358/446, 447, 448, 452, 358/461, 455, 458, 462, 463

[56] References Cited

U.S. PATENT DOCUMENTS

| 4,335,407 | 6/1982 | Atoji et al. | 358/447 |
| 4,484,232 | 11/1984 | Gast | 358/284 |
| 4,536,803 | 8/1985 | Hennig | 358/284 |
| 4,591,923 | 5/1986 | Urabe et al. | 358/447 |
| 4,670,793 | 6/1987 | Yamada et al. | 358/463 |
| 4,785,347 | 11/1988 | Ezuka et al. | 358/447 |

Primary Examiner—Edward L. Coles, Sr.
Assistant Examiner—Jerome Grant, II
Attorney, Agent, or Firm—Lowe, Price, LeBlanc, Becker & Shur

[57] ABSTRACT

Detail enhancement is achieved by producing an enhanced image signal (ES) on the basis of a sharp signal (S), a middle signal (M) and an unsharp signal (U). The sharp signal represents density of a pixel, the middle signal represents weighted mean density of a first area larger than a pixel, and the unsharp signal represents weighted mean density of a second area larger than the first area. Three differential signals (S−M, S−U, M−U) are obtained and multiplied by respective coefficients to become three enhancements signals. The enhanced image signal is obtained by adding the sharp signal and at least one of the three enhancement signals so that the detail enhancement is achieved at a middle range of spatial frequency.

38 Claims, 25 Drawing Sheets

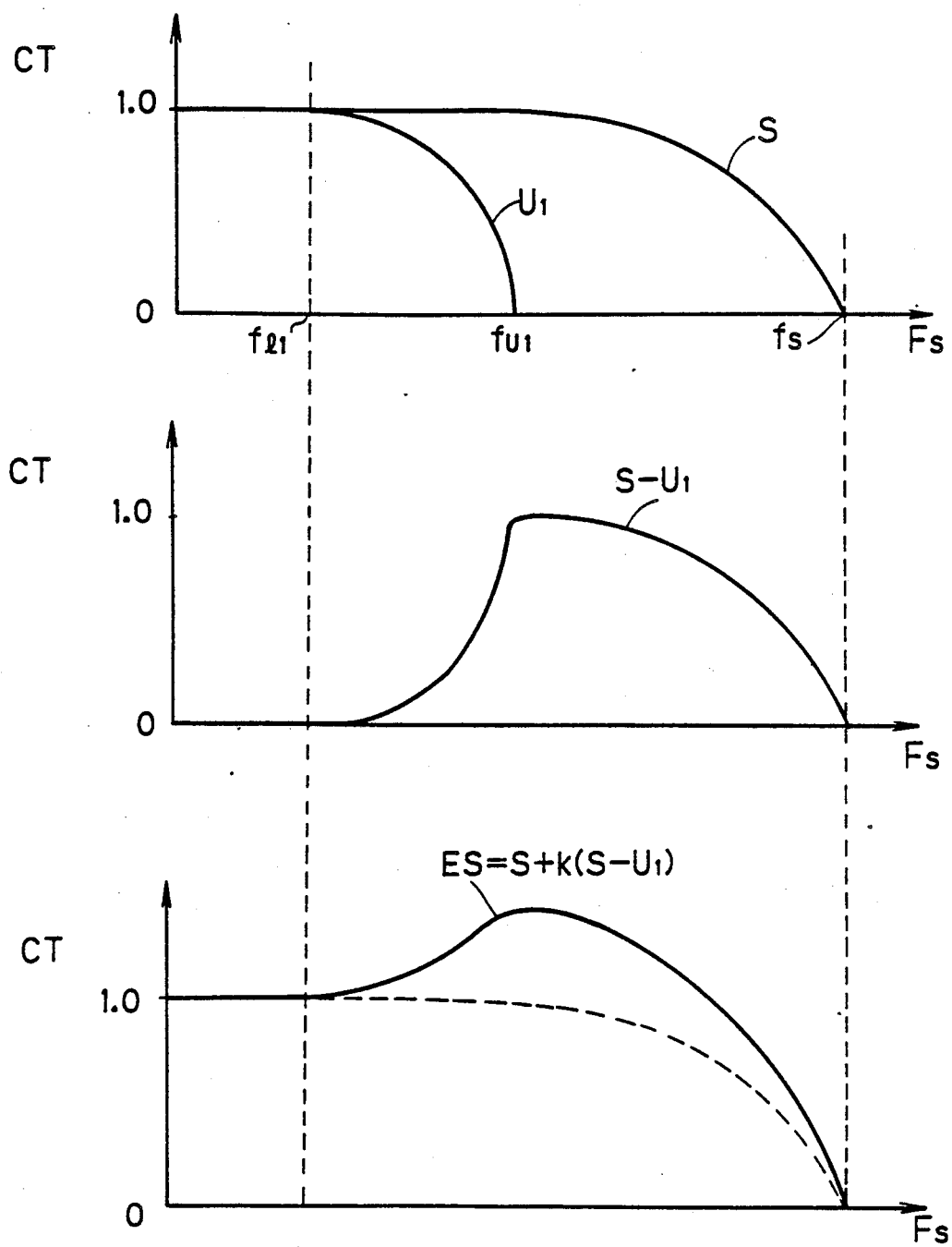

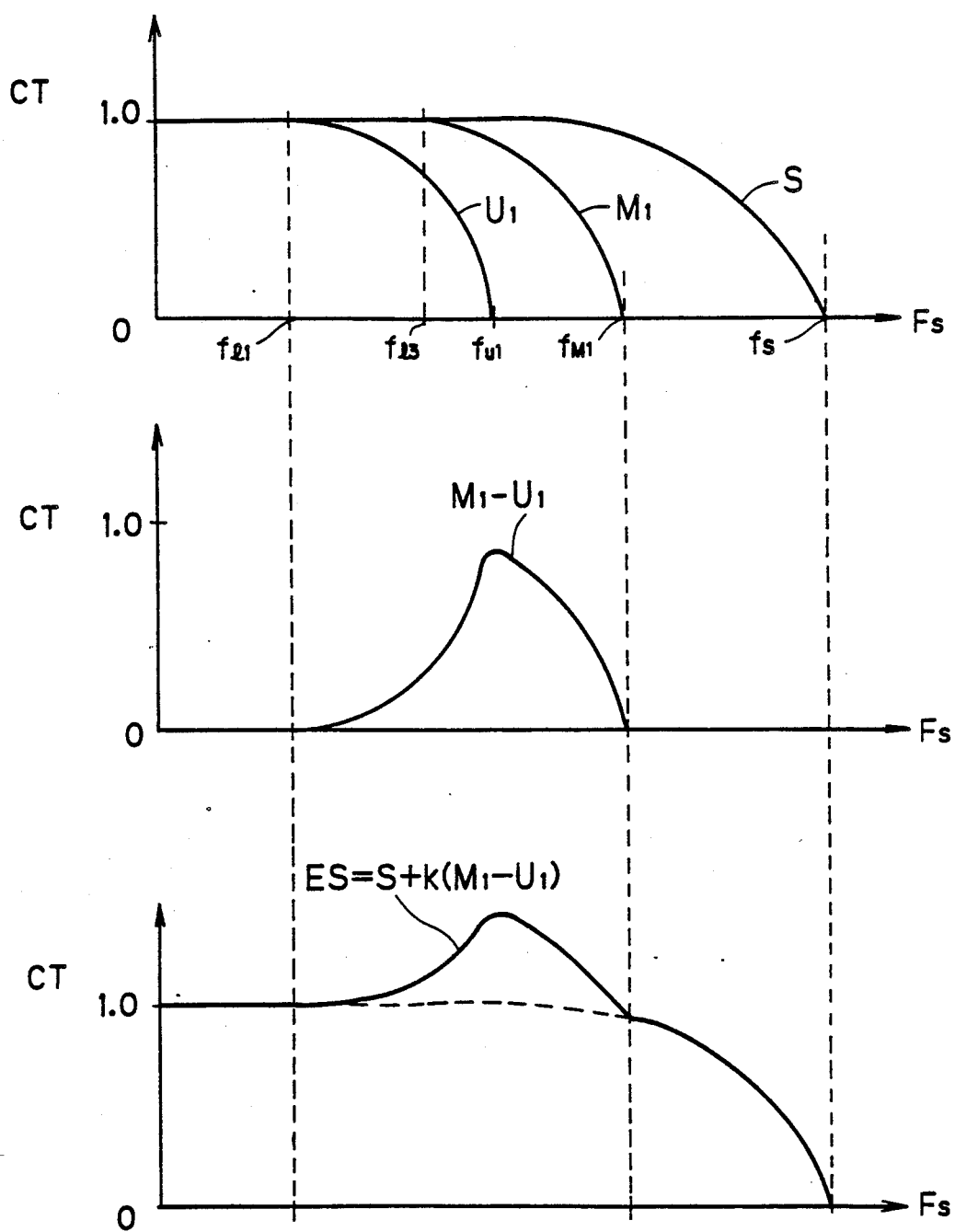

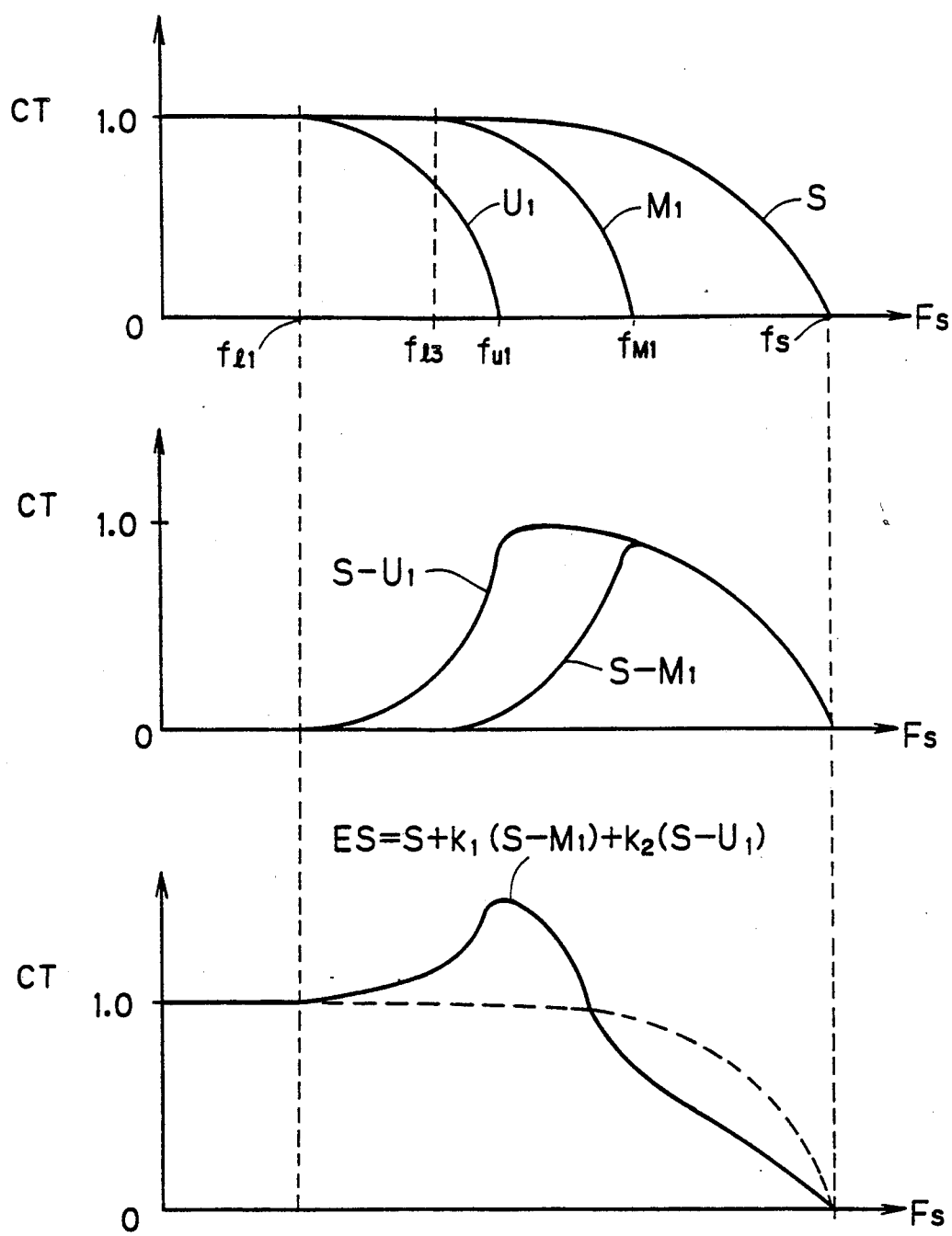

METHOD OF AND APPARATUS FOR PERFORMING DETAIL ENHANCEMENT

BACKGROUND OF THE INVENTION

1. Field of the Invention

The present invention is related to a method of and an apparatus for performing detail enhancement to improve sharpness of the image.

2. Description of the Prior Art

In detail enhancement, a so-called sharp signal S and a so-called unsharp masking signal U are first obtained by scanning an original. The sharp signal S represents density of each pixel. The unsharp signal U for each pixel represents average density of a certain area around each pixel. A basic enhancement signal (S−U) is obtained by subtracting the unsharp signal U from the sharp signal S. Usually, an enhancement signal k(S−U) is obtained by multiplying a coefficient k and the basic enhancement signal (S−U) to adjust the magnitude of the detail enhancement. An enhanced image signal of the original is finally produced by adding the enhancement signal k(S−U) and the sharp signal S, whereby sharpness of a reproduced image improves.

A process scanner often utilizes a method of directly reading a greater area than one pixel at a time to obtain the unsharp signal U. FIGS. 1A and 1B are diagrams showing weighting factors employed in the detail enhancement in a process scanner. FIG. 1A illustrates a weighting factor $W_1$ which is constant over an averaging area R around a center pixel P. FIG. 1B illustrates another weighting factor $W_2$ suggested by Japanese Patent Publication Gazette No. 39-24581. The weighting factor $W_2$ is largest at the center pixel P and becomes smaller toward the periphery of the averaging area R. The process scanner produces the unsharp signal by optically obtaining weighted mean density over the averaging area R around each pixel P with the weighting factor $W_1$ or $W_2$.

In addition, Japanese Patent Laying Open Gazette No. 59-141871 discloses a method of obtaining the unsharp signal by digital operation. FIG. 1C is a diagram showing a weighting factor $W_2$ employed in this method. This method, while utilizing a buffer memory for storing an image signal with respect to several scanning lines, executes digital operation for obtaining the weighted means density over the averaging area R with the weighting factor $W_3$, thereby obtaining the unsharp signal.

FIGS. 2A and 2B are graphs showing MTF (Modulation Transfer Function) characteristics of the sharp signal S, the unsharp signal U, the basic enhancement signal (S−U) and the enhanced image signal $ES(=S+K(S−U))$. The graphs of FIGS. 2A and 2B are obtained by using the weighting factors $W_1$ and $W_2$, respectively. Because the basic enhancement signal (S−U) has a similar contrast ratio CT to that of the sharp signal S at comparatively higher spatial frequency $F_S$ and the enhanced image signal ES is based on the sharp signal S and the basic enhancement signal (S−U), the enhanced image signal ES also has a considerable contrast ratio CT up to as high spatial frequency as the sharp signal S has.

The unsharp signal $U_1$ of FIG. 2A is obtained by using a constant weighting factor, such as that of FIG. 1A. The upper limit frequencies $f_S$, $f_{U1}$ of the sharp signal S and the unsharp signal $U_1$ depend on radii of apertures employed in reading an original to obtain the sharp signal S and the unsharp signal $U_1$, respectively. A spatial frequency $f_{l1}$ at which the contrast ratio CT starts to decrease depends on the shape of the weighting factor, and the like.

The unsharp signal $U_2$ of FIG. 2B is obtained by using the weighting factor $W_2$. The upper limit frequencies $f_{U2}$ and $f_S$ depend on radii of apertures, similarly.

As can be seen in FIGS. 2A and 2B, the greater the coefficient k becomes, the greater the contrast ratio CT becomes at the spatial frequency under the upper limit frequency $f_S$. This means that the detail enhancement is effective up to the upper limit frequency $f_S$ of the sharp signal S. However, in this case, roughness and granular noise in an original are also enhanced; this lowers quality of a reproduced image. Consequently, the coefficient k could not be set so great.

In order to produce an image to be seen sharp with the naked eye, the image signal is desirably enhanced at the middle range of the spatial frequency far below the upper limit frequency of the sharp signal S. According to the conventional methods, however, the image signal is enhanced at the higher range as well as the middle range of the spatial frequency. Therefore, noises included in an original image are also enhanced.

SUMMARY OF THE INVENTION

The present invention is directed to a method of and an apparatus for enhancing detail in an image by producing an enhanced image signal representing the image with the detail enhanced. The method comprises the steps of: (a) scanning an original with respect to each pixel to produce a sharp signal representing density of each pixel, a middle signal representing weighted mean density of a first area about each pixel with a first weighting factor, and an unsharp signal representing weighted mean density of a second area about each pixel with a second weighting factor, the first area being larger than a pixel, the second area being still larger than the first area, (b) obtaining differential signal between the middle signal and the unsharp signal to produce a basic enhancement signal, (c) multiplying the basic enhancement signal by a coefficient to produce an enhancement signal, and (e) adding the sharp signal and the enhancement signal to produce the enhanced image signal.

Preferably, the basic enhancement signal is produced by subtracting the unsharp signal from the middle signal, and the coefficient has a plus sign.

The present invention is also directed to a method and an apparatus therefor comprising the steps of: (a) scanning an original with respect to each pixel to produce a sharp signal representing density of each pixel, a middle signal representing weighted mean density of a first area about each pixel with a first weighting factor, and an unsharp signal representing weighted mean density of a second area about each pixel with a second weighting factor, the first area being larger than a pixel, the second area being still larger than the first area, (b) producing two out of first through third basic enhancement signals, where said first basic enhancement signal is to be produced by subtracting the middle signal from the sharp signal, said second basic enhancement signal is to be produced by subtracting the unsharp signal from the sharp signal, and said third basic enhancement signal is to be produced by subtracting the unsharp signal from the middle signal, (c) multiplying two basic enhancement signals produced at the step (b) by respective coefficients, the coefficients having opposite signs to each other, one of the coefficients for one of the two basic enhancement signals which includes higher spatial frequency components than the other basic enhancement signal having a minus sign, to thereby producing two enhancement signals, and (d) adding the sharp signal and the two enhancement signals to produce the enhanced image signal.

According to an aspect of the present invention, the two basic enhancement signals produced at the step (b) consist of the first and second basic enhancement signals, and the coefficients for the first and second basic enhancement signals have minus and plus signs, respectively.

According to another aspect of the present invention, the two basic enhancement signals produced at the step (b) consist of the second an third basic enhancement signals, and the coefficients for the second and third basic enhancement signals have minus and plus signs, respectively.

According to still another aspect of the present invention, the two basic enhancement signals produced at the step (b) consist of the first and third basic enhancement signals, and the coefficients for the first and third basic enhancement signals have minus and plus signs, respectively.

The present invention is further directed to a method and an apparatus therefor comprising the steps of: (a) scanning an original with respect to each pixel to produce a sharp signal representing density of each pixel, a middle signal representing weighted mean density of a first area about each pixel with a first weighting factor, and an unsharp signal representing weighted mean density of a second area about each pixel with a second weighting factor, the first area being larger than a pixel, the second area being still larger than the first area, (b) subtracting the middle signal from the sharp signal to produce a first basic enhancement signal, (c) subtracting the unsharp signal from the sharp signal to produce a second basic enhancement signal, (d) subtracting the unsharp signal from the middle signal to produce a third basic enhancement signal, (e) multiplying the first, second and third basic enhancement signals by respective first, second and third coefficients to produce first, second and third enhancement signals, respectively, and (f) adding the sharp signal and the first, second and third enhancement signals to produce the enhanced image signal.

According to an aspect of the present invention, the first and second coefficients have minus and plus signs, respectively. An absolute value of the first coefficient is preferably greater than an absolute value of the second coefficient. The third coefficient may have a minus sign, and an absolute value of the third coefficient may be smaller than the absolute value of the second coefficient.

According to another aspect of the present invention, the second and third coefficients have minus and plus signs, respectively. An absolute value of the third coefficient is preferably greater than an absolute value of the second coefficient. The first coefficient may have a plus sign and an absolute value of the first coefficient may be smaller than the absolute value of the second coefficient.

Preferably, the coefficients are variable in the above aspects of the present invention.

Accordingly, an object of the present invention is to suppress the detail enhancement at comparatively high spatial frequency and prevent the granular noise and the like, while considerably enhancing the image signal at the middle frequency range which is important to improve sharpness of a reproduced image to be seen with the naked eye.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 2A and 2B are graphs showing the MTF characteristics of various signals in the prior art;

FIGS. 6A, 6B, 7A and 7B are diagrams showing the MTF characteristics of various signals in the preferred embodiment;

DESCRIPTION OF THE PREFERRED EMBODIMENT

Figure 1A:
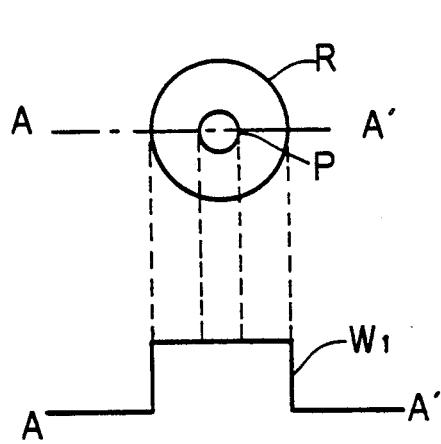
FIGS. 1A through 1C are diagrams showing weighting factors employed in detail enhancement in the prior art.
Figure 1B:
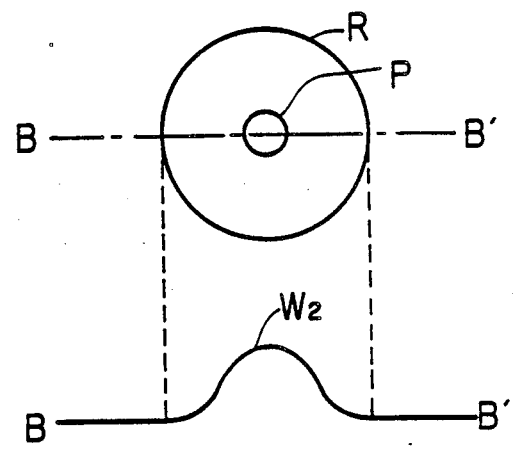
Figure 1C:
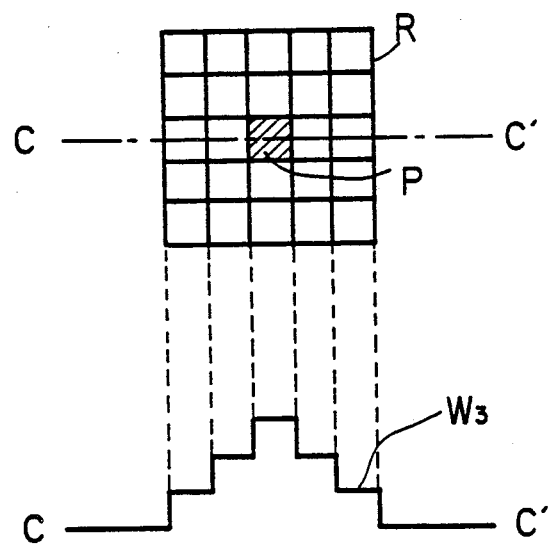
Figure 2B:
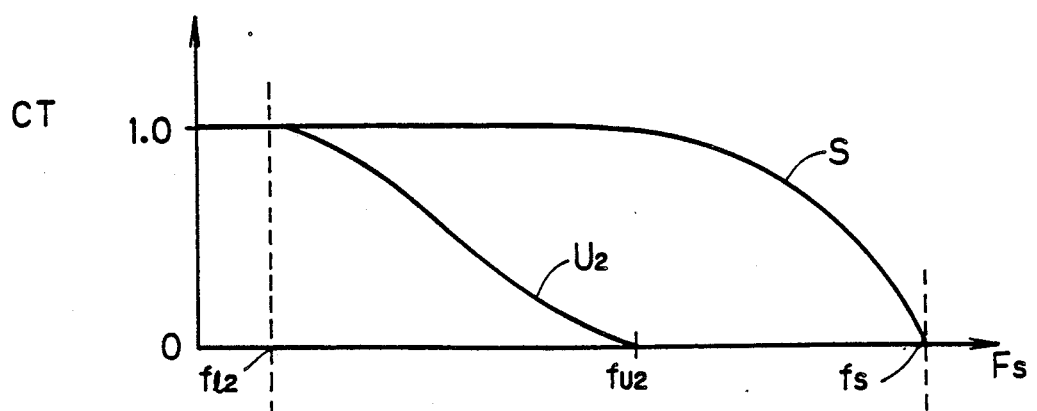
Figure 2B:
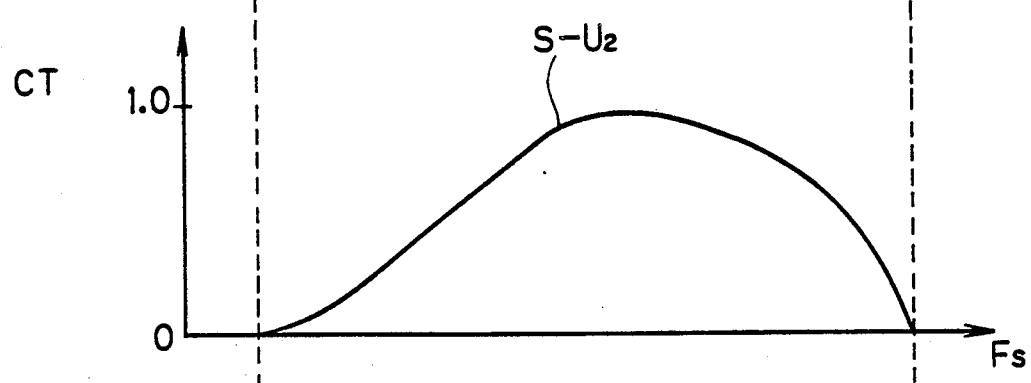
Figure 2B:
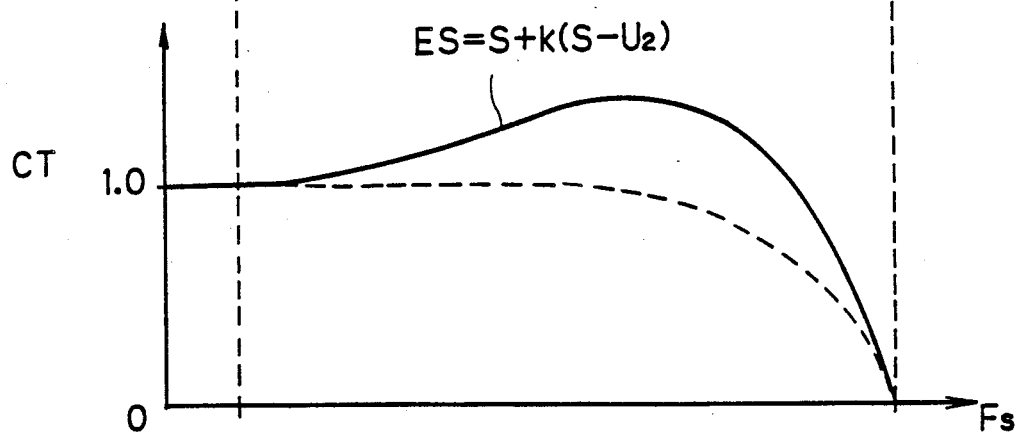
Figure 3:
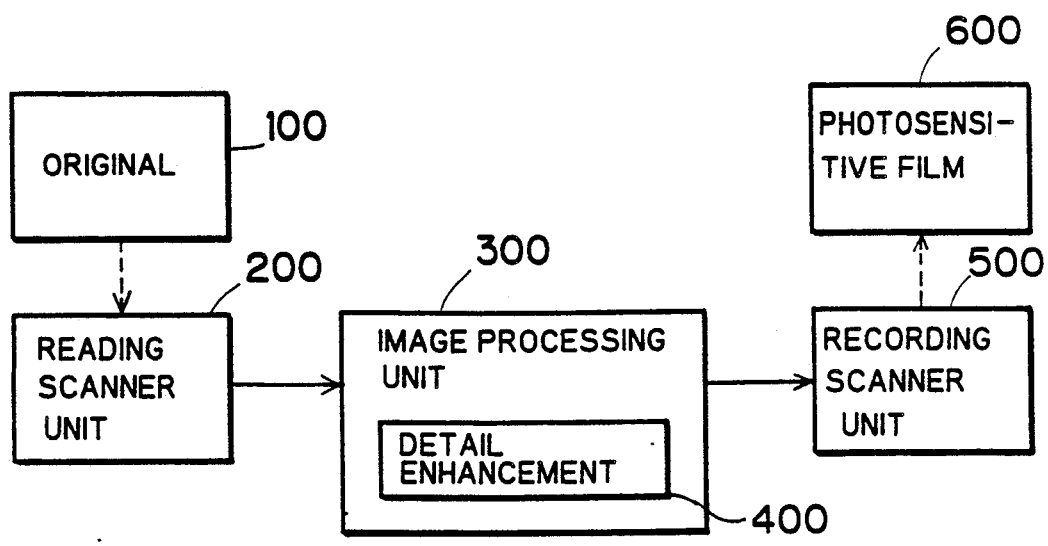
FIG. 3 is a block diagram showing the structure of a process scanner employed in a preferred embodiment of the present invention.

FIG. 3 is a block diagram showing the structure of a process scanner employed in a preferred embodiment of the present invention. A reading scanner unit 200 reads an original 100 with respect to each pixel to obtain an image signal. The image signal is supplied to an image processing unit 300. The image processing unit 300 comprises a detail enhancement unit 400 to perform detail enhancement on the given image signal. The function of the detail enhancement unit 400 will be described later in detail. The image signal processed in the image processing unit 300 is supplied to a recording scanner unit 500. The recording scanner unit 500 converts the image signal into a halftone dot signal and exposes a photosensitive film 600 according to the halftone dot signal to record a halftone image.

Figure 4A:
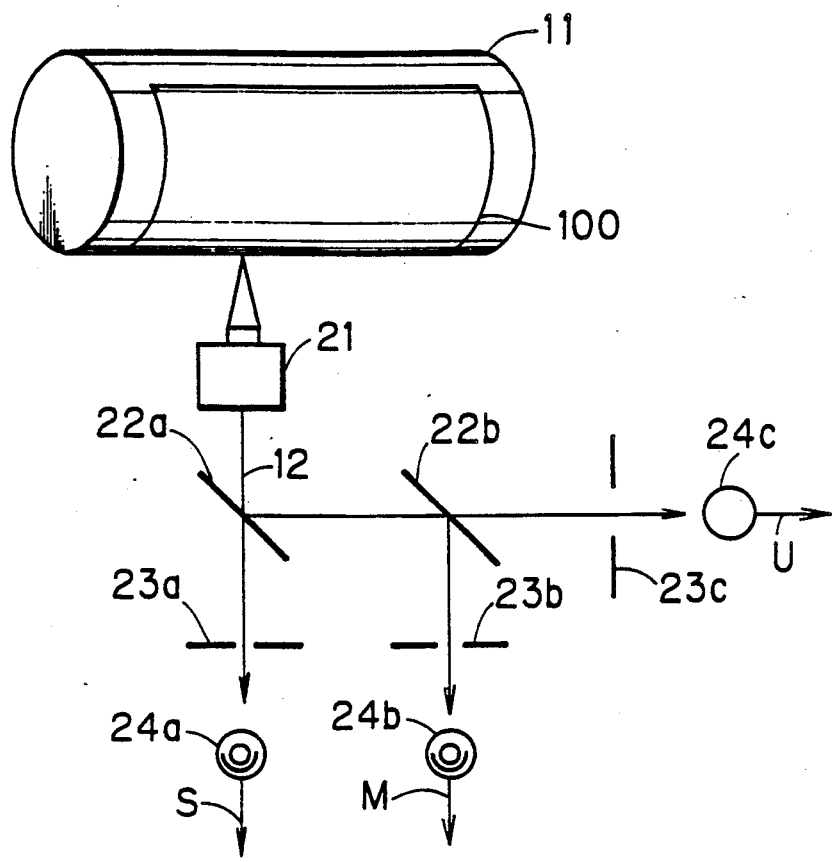
FIG. 4A is a diagram showing the structure of an optical reading system.

FIG. 4A is a diagram showing the structure of an optical reading system in the reading scanner unit 200. The original 100 wound round a reading drum 11 is read by a pick-up head 21. A part of light 12 including image information passes through a half mirror 22a and a mask 23a for a sharp signal to be received by a photomultiplier 24a. The photomultiplier 24a converts the light 12 into a sharp signal S. Another part of the light 12 reflected by the half mirror 22a is partly reflected by another half mirror 22b again. The light reflected by the half mirror 22b passes through a mask 23b for a middle signal to be received by a photomultiplier 24b to be converted into a middle signal M. The mask 23b is one of the characteristic element of the preferred embodiment. The transmitted light 12 from the half mirror 22b passes through a mask 23c for an unsharp signal to be received by a photomultiplier to be converted into an unsharp signal U.

Figure 4B:
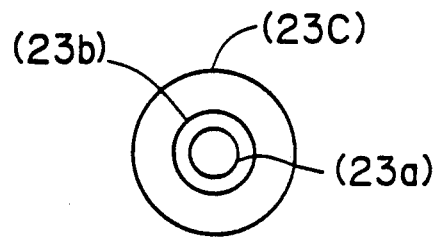
FIG. 4B is a diagram showing the size of apertures employed in the preferred embodiment.

FIG. 4B shows the size of apertures of the masks 23a, 23b and 23c. The optical axes of the apertures are imaginally placed at the center of FIG. 4B. The radius of the aperture of the mask 23b for the middle signal is greater than that of the mask 23a for the sharp signal and smaller than that of the mask 23c for the unsharp signal. The mask 23b for the middle signal is installed to adjust the enhanced image signal at comparatively high spatial frequency. The structure shown in FIGS. 4A and 4B is employed in analog processing of the image signal. Another structure for digital processing will be described later.

Figure 5A:
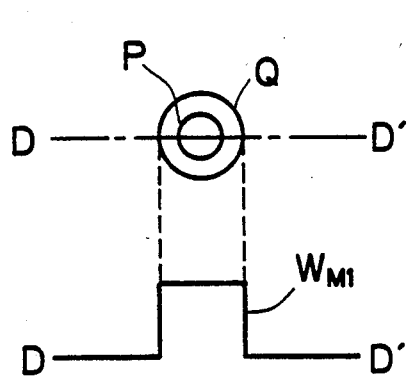
FIGS. 5A and 5B are diagrams showing the example of a weighting factor for a middle signal.
Figure 5B:
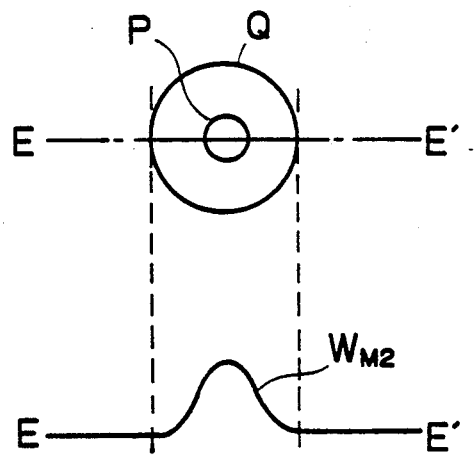

FIGS. 5A and 5B are diagrams showing examples of weighting factors for the middle signal M. FIG. 5A illustrates a weighting factor $W_{M1}$ on line D—D' over a first area Q around a pixel P; the weighting factor $W_{M1}$ is constant over the first area Q. FIG. 5B illustrates a weighting factor $W_{M2}$ on line E—E' over a first area Q; optical transmittance varies in the first area, whereby the weighting factor $W_{M2}$ is greater in the center and smaller in the periphery.

The middle signal obtained by using the weighting factor $W_{M1}$ or $W_{M2}$ partly depends on the sharp signal S of the center pixel P. An enhancement image signal ES can be defined by the following equation (1) using the middle signal M:

$$ES = S + k(M - U) \qquad (1)$$

where k is a constant having a positive value.

Figure 6B:
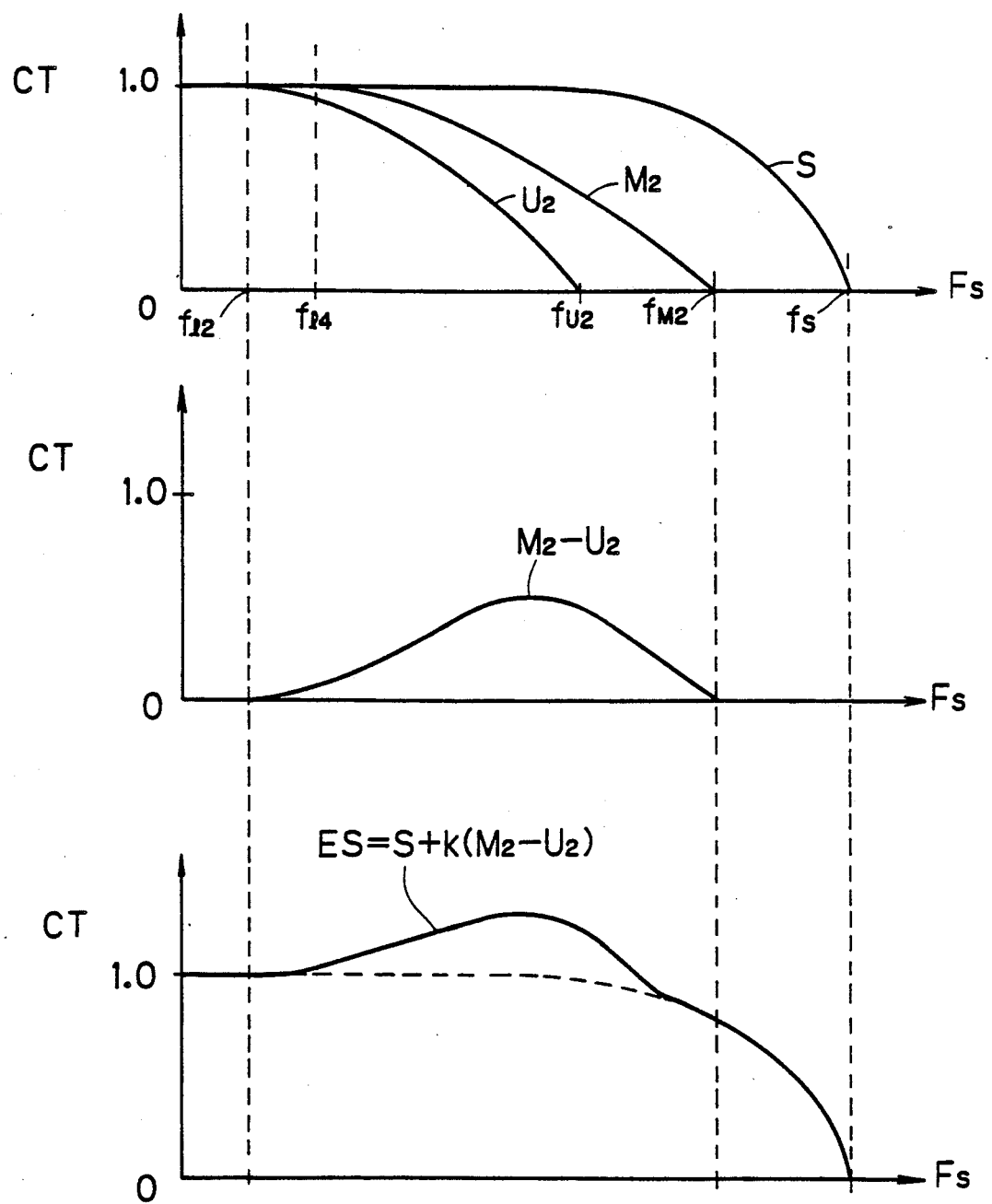

FIGS. 6A and 6B are diagrams showing the MTF characteristics of the enhanced image signal ES and the like. The contrast ratio CT for the image signals S, M, U and ES is defined as follows:

$$CT = C_2/C_1$$

where $C_1$ denotes a contrast of an original image and $C_2$ denotes a contrast of an image represented by an image signal. The contrast C ($C_1$ or $C_2$) is defined as follows:

$$C = (I_{max} - I_{min})/(I_{max} + I_{min})$$

where $I_{max}$ denotes a maximum intensity of light and $I_{min}$ denotes a minimum intensity of light.

The contrast ratio CT for the differential signal between two of the three original signals S, M and U, such as the basic enhancement signal ($M_1 - U_1$), is defined to be a ratio of an amplitude of the differential signal to an amplitude of one of the original signal.

FIG. 6A illustrates the case in which the middle signal $M_1$ and the unsharp signal $U_1$ are obtained by using the weighting factors $W_1$ and $W_{M1}$, respectively. FIG. 6B illustrates the case in which the middle signal $M_2$ and the unsharp signal $U_2$ are obtained by using the weighting factors $W_{M2}$ and $W_2$, respectively.

Upper limit frequencies $f_S$, $f_{M1}$ and $f_{U1}$ of the sharp, middle and unsharp signals, respectively, shown in FIG. 6A, mainly depend on the diameters of corresponding apertures, respectively. This is the same for upper limit frequencies $f_S$, $f_{M2}$ and $f_{U2}$ shown in FIG. 6B. The greater the diameters of the apertures become, the lower the upper limit frequencies, which represent resolution, become. Frequencies $f_{l1}$-$f_{l4}$ at which the contrast ratio CT starts to decrease depend on the distribution of the weighting factors and the radii of the apertures. The contrast ratio CT starts to decrease at the frequencies $f_{l1}$ and $f_{l2}$ for the unsharp signals $U_1$ and $U_2$, and at the frequencies $f_{l3}$ and $f_{l4}$ for the middle signals $M_1$ and $M_2$, respectively. In general, it is held that $f_{l1} < f_{l3}$, $f_{l2} < f_{l4}$, $f_{l2} < f_{l1}$, and $f_{l4} < f_{l3}$.

The middle part of FIG. 6A shows a basic enhancement signal ($M_1 - U_1$). The enhanced image signal ES shown at the lower part of FIG. 6A is obtained according to the equation (1). The enhanced image signal ES is enhanced at a frequency range a little below the frequency $f_{M1}$, and is not enhanced at a frequency range higher than the frequency $f_{M1}$. Similarly in FIG. 6B, the enhanced image signal ES is enhanced mainly at a frequency range a little below the frequency $f_{M2}$ and is not enhanced at a frequency range higher than the frequency $f_{M2}$.

The enhanced image signal ES can be defined by the following equation (2) instead of the the equation (1):

$$ES = S + k_1(S - M) + k_2(S - U) \qquad (2)$$

where $k_1$ and $k_2$ are constants not equal to zero.

Figure 7B:
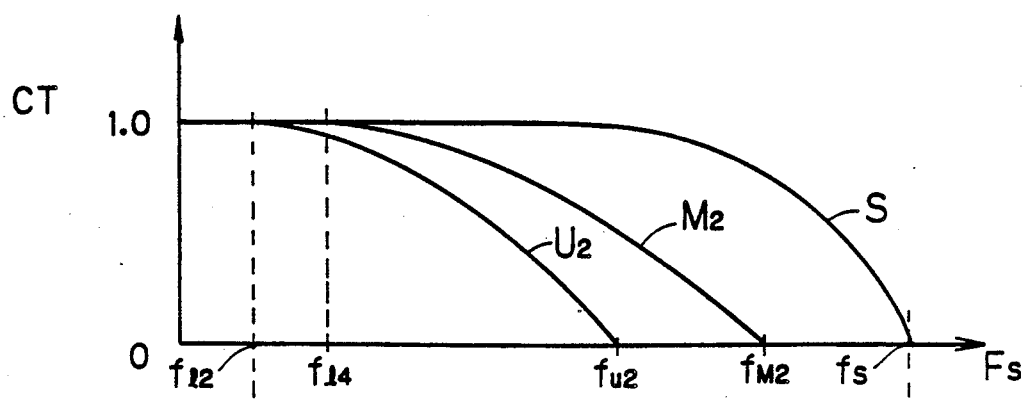
Figure 7B:
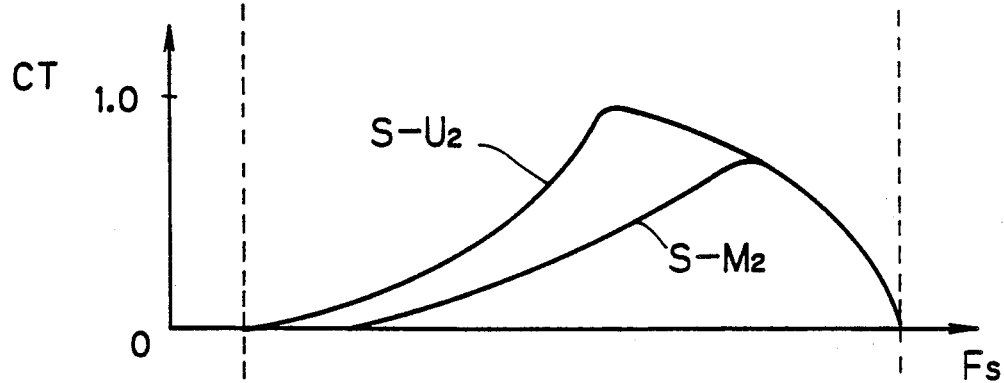
Figure 7B:
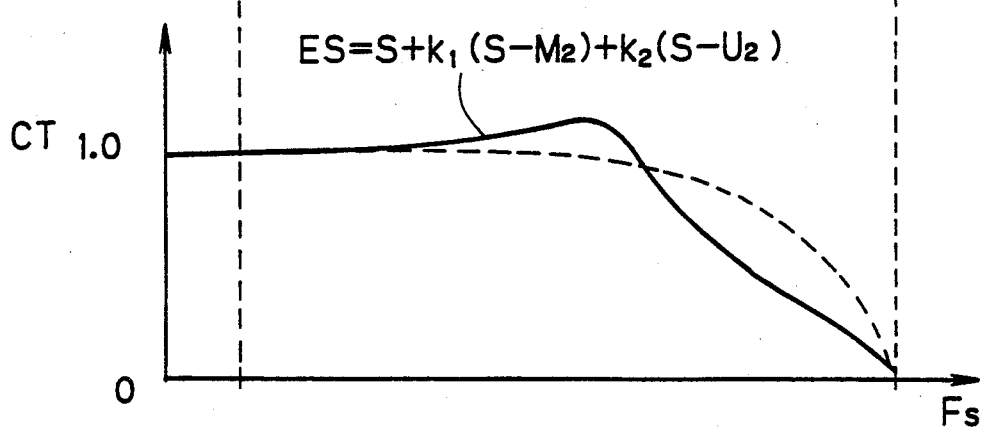

FIGS. 7A and 7B are graphs showing the MTF characteristics of the enhanced image signal ES according to the equation (2). FIG. 7A illustrates the case in which the middle signal $M_1$ and the unsharp signal $U_1$ are obtained by using the constant weighting factors $W_1$ and $W_{M1}$, respectively. FIG. 7B illustrates the case in which the middle signal $M_2$ and the unsharp signal $U_2$ are obtained by using the weighting factors $W_{M2}$ and $W_2$, which are largest at the center pixel, respectively.

The middle part of FIG. 7A shows two types of basic enhancement signals ($S - M_1$) and ($S - U_1$) employed in the equation (2). The enhanced image signal ES shown at the lower part of FIG. 7A is obtained while substituting $k_1 = -1.0$ and $k_2 = 0.5$ in the equation (2). The enhanced image signal ES is enhanced mainly at a frequency range lower than the frequency $f_{M1}$. The contrast ratio CT of the enhanced image signal ES is reduced from that of the sharp signal S at a frequency range higher than the frequency $f_{M1}$. Similarly in FIG. 5B, the enhanced image signal ES is enhanced mainly at a frequency range lower than the frequency $f_{M2}$ and the contrast ratio CT is reduced at a frequency range higher than the frequency $f_{M2}$.

In the above cases shown in FIGS. 6A, 6B, 7A and 7B, the contrast ratio CT of the enhanced image signal ES is maintained at most the value of the sharp signal S at the spatial frequency ranging from $f_{M1}$ to $f_S$ (or from $f_{M2}$ to $f_S$) below the upper limit frequency $f_S$ of the sharp signal S. Accordingly, roughness and granular noise in an original image are not enhanced. On the other hand, the detail of the image signal is considerably enhanced at a middle frequency range which is important to improve sharpness of a repreduced image to be seen with the naked eye.

Now digital processing for obtaining the enhanced image signal will be described. In the digital processing, the sharp signal S for each pixel is obtained by reading an original, and the middle signal M and the unsharp signal U are formed from the sharp signal S.

Figure 8A:
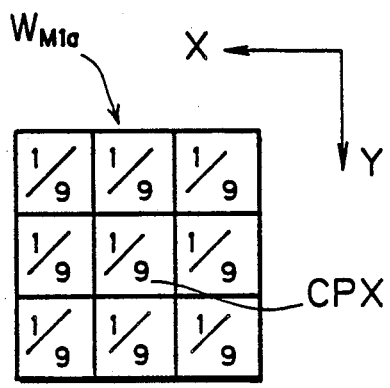
FIGS. 8A, 8B, 9A, 9B and 10A through 10C illustrate distributions of weighting factors employed in digital processing.
Figure 8B:
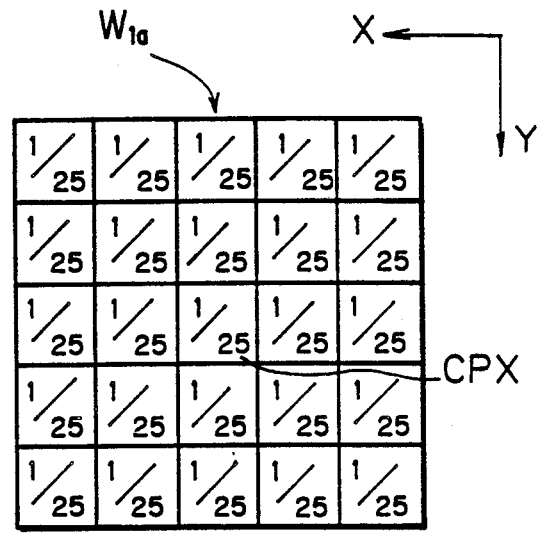
Figure 9A:
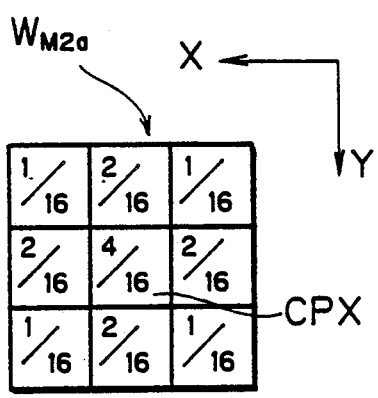
Figure 9B:
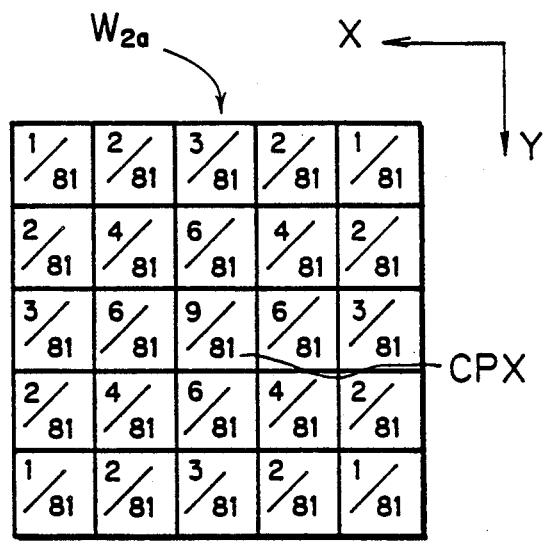

FIGS. 8A and 8B illustrate distributions of constant weighting factors $W_{M1a}$ and $W_{1a}$ employed in generating the middle signal $M_1$ and the unsharp signal $U_1$, respectively. FIG. 9A and 9B illustrate distributions of weighting factors $W_{M2a}$ and $W_{2a}$, which are largest at the center, employed in generating the middle signal $M_2$ and the unsharp signal $U_2$, respectively. It is supposed that the middle signal $M_1$ or $M_2$ for a pixel CPX is generated on the basis of the sharp signal S for a $3 \times 3$ pixel matrix around the central pixel CPX, and the unsharp signal $U_1$ or $U_2$ for the pixel CPX is generated on the basis of the sharp signal S for a $5 \times 5$ pixel matrix around the central pixel CPX. Greater matrices are employed instead. In any case, the central pixel CPX is common to the two matrices for the middle and unsharp signals and the matrix for the middle signal is smaller than that for the unsharp signal. Incidentally, a main scanning direction X and a subscanning direction Y are shown in FIGS. 8A, 8B, 9A and 9B.

Figure 10A:
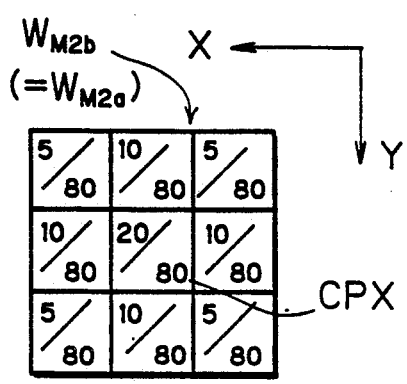
Figure 10B:
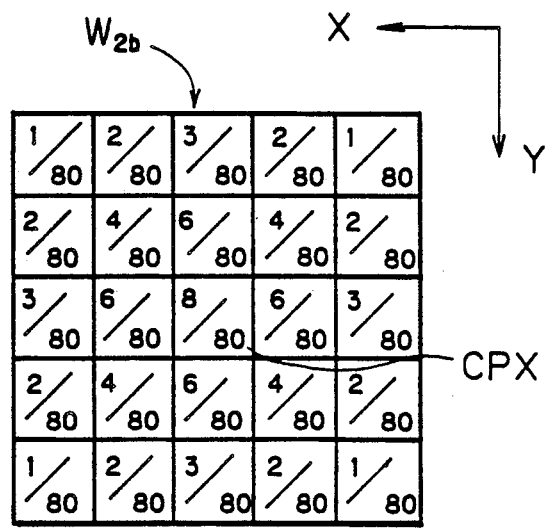
Figure 10C:
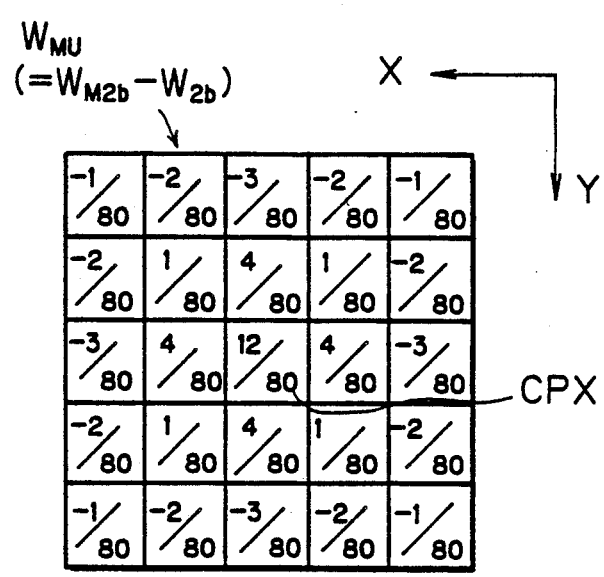

FIG. 10A illustrates a distribution of a weighting factor $W_{M2b}$ which is obtained by multiplying both of the numerators and the denominators of the weighting factor $W_{M2a}$ of FIG. 9A by five. A weighting factor $W_{2b}$ shown in FIG. 10B is obtained by multiplying the weighting factor $W_{2a}$ of FIG. 9B by 81/80 and fixing an approximate integer to each numerator while maintaining the summation of the numerators equal to eighty. A weighting factor $W_{MU}$ shown in FIG. 10C is obtained by subtracting the weighting factor $W_{2b}$ from the weighting factor $W_{M2b}$ while the value of the weighting factor $W_{M2b}$ is assumed to be zero outside the $3 \times 3$ pixel matrix. The weighting factor $W_{MU}$ is employed in directly computing the basic enhancement signal $(M - U)$ in the equation (2). This weighting factor $W_{MU}$ is positive at the inner portion and negative at the outermost portion. The basic enhancement signal $(M - U)$ is obtained directly from the sharp signal S with the weighting factor $W_{MU}$.

Figure 11:
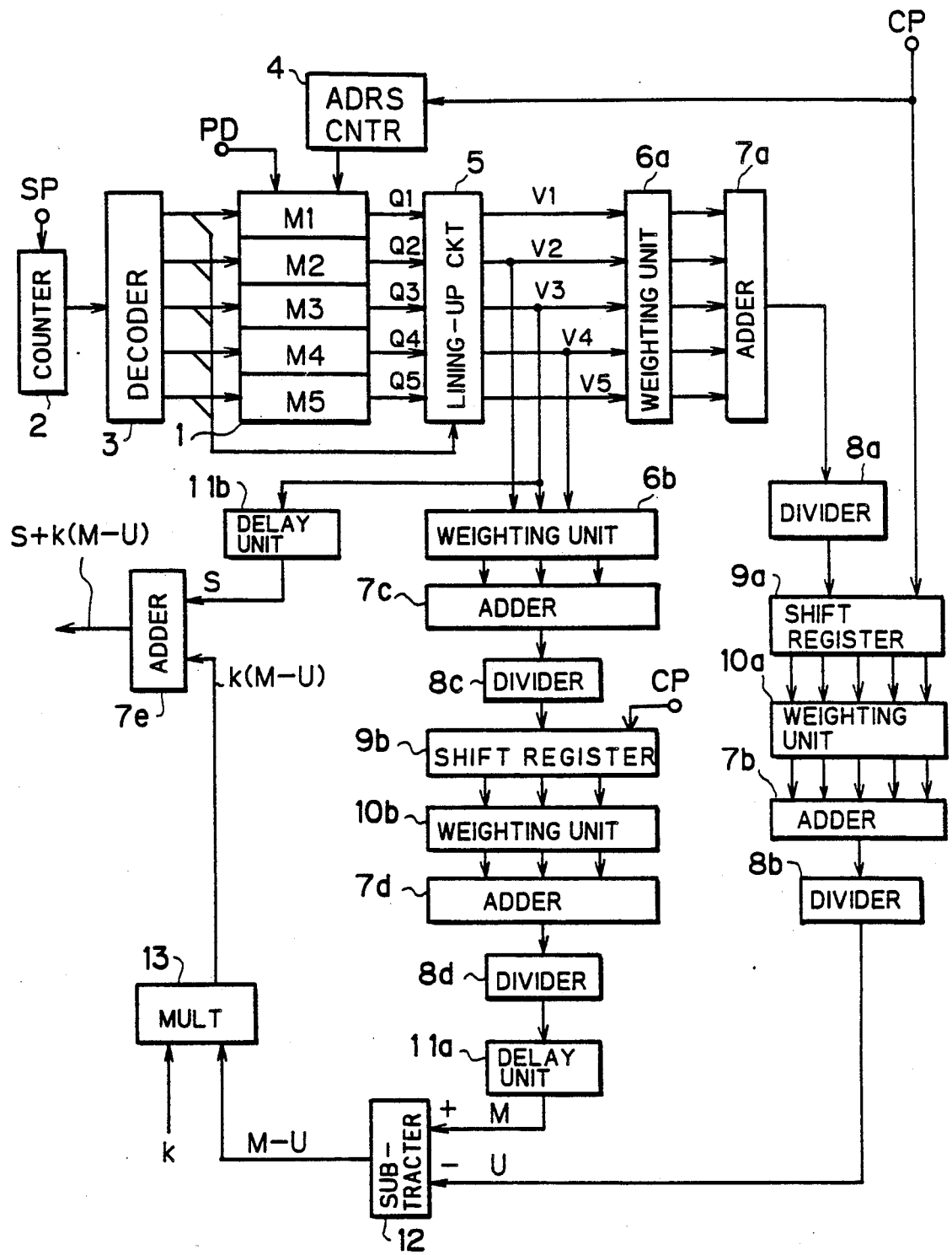
FIGS. 11 and 12 are block diagrams showing a first example of the inner structure of a detail enhancement unit.

FIG. 11 is a block diagram showing the inner structure of the detail enhancement unit 400 constructed as a digital circuit for performing the processing described above. Digital image data PD, which is A-D converted in the image processing unit 300 are temporalily stored in an image memory 1. The image memory 1 comprises memory blocks (or line memories) M1-M5 each of which stores the image data PD for one main scanning line. The image data PD stored in the memory blocks M1-M5 are replaced when the memory block M1-M5 are cyclicly designated by a decoder 3 one by one. The decoder 3 is supplied with a number from a divide-by-5 conter 2 which counts a given scanning pulse SP. One of the memory blocks M1-M5 is designated by the decoder 3 for each main scanning. Therefore, the image data in all of the memory blocks M1-M5 are replaced in five times of the main scanning.

The image data PD are read out in order of the main scanning direction from one of the memory block M1-M5 designated by the decoder 3 according to an order specified by an output from an address counter 4. The address counter 4 generates its output in response to a pixel clock pulse CP which is synchronized with the main scanning. New image data PD are written in that address in a designated memory block from which previous image data are read out in response to the output of the address counter 4. The output of the address counter 4 are also supplied to the other four memory blocks which are not designated by the decoder 3, whereby image data stored in the other four memory blocks are also read out simultaneously. Consequently, five image data Q1-Q5 are simultaneously read out form the memory blocks M1-M5, respectively. The five image data Q1-Q5 represent respective density values of five pixels which are positioned on sequential five main scanning lines and whose main scanning coordinates are equal to each other.

These image data Q1-Q5 are supplied from the image memory 1 to a lining-up circuit 5, and arranged therein in order of the main scanning coordinate according to information given by the decoder 3. The image data Q1-Q5 are outputted from the lining-up circuit 5 as a set of image data V1-V5 arranged in a line.

The image data V1-V5 are supplied to a weighting unit 6a. The weighting unit 6a executes weighting operation with the weighting factor $W_{2a}$ shown in FIG. 9B in the subscanning direction Y. The results of the weighting operation are supplied from the weighting unit 6a to an adder 7a to be added to each other. The summation is supplied from the adder 7a to a divider 8a and divided therein by a prescribed constant for normalization. The output of the divider 8a is supplied to a shift register 9a and outputted therefrom in order of the main scanning coordinate in sychronism with the pixel clock pulse CP. Another weighting unit 10a executes weighting operation on the output data from the shift register 9a with the weighting factor $W_{2a}$ in the main scanning direction X. The output data of the weighting unit 10a, which are image data weighted in both of the main scanning direction and the subscanning direction, are added to each other in an adder 7b. The output of the adder 7b is divided by a prescribed constant for normalization in a divider 8b to become the unsharp signal U.

On the other hand, three image data V3, V4 and V5 are supplied from the lining-up circuit 5 to a weighting unit 6b to be converted into the middle signal M. These image data V3-V5 are subjected to similar processing to that for generating the unsharp signal U, with the weighting unit 6b, an adder 7c, a divider 8c, a weighting unit 10b, another adder 7b and another divider 8d. The output of the divider 8d is delayed for a prescribed delay time corresponding to one pixel in a delay unit 11a to be outputted therefrom as the middle signal M.

A subtracter 12 receives the middle signal M and the unsharp signal U and subtracts the unsharp signal U from the middle signal M to generate the basic enhancement signal $(M - U)$. The basic enhancement signal $(M - U)$ is multiplied by a prescribed coefficient k in a multipication unit 13 to become the enhancement signal $k(M - U)$. The enhancement signal $k(M - U)$ is supplied from the multiplication unit 13 to an adder 7e.

The image data V3 is supplied from the memory block M3 to a delay unit 11b and delayed for a prescribed delay time corresponding to two pixels therein to become the sharp signal S. The sharp signal S is supplied to the adder 7e.

The adder 7e adds the enhancement signal $k(M - U)$ and the sharp signal S to generate the enhanced image signal $ES = S + k(M - U)$.

Figure 12:
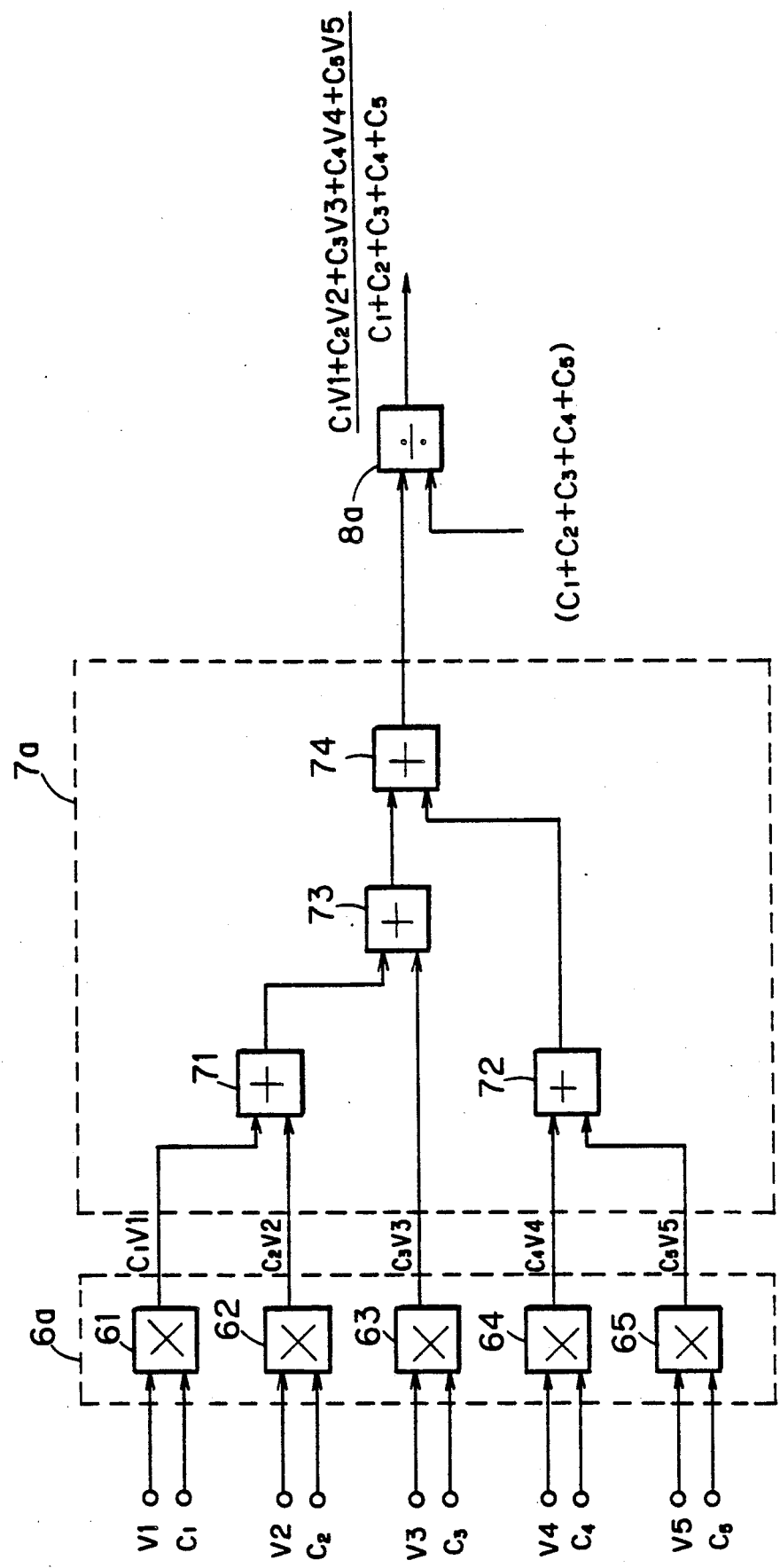

FIG. 12 is a block diagram showing the inner structure of the weighting unit 6a, the adder 7a and the divider 8a. The weighting unit 6a comprises five multiplication units 61–65. The multiplication units 61–65 multiply the image data V1–V5 by prescribed constants C1–C5, respectively. The adder 7a comprises four adder elements 71–74. The adder element 71 adds up the products $C_1V1$ and $C_2V2$. The adder element 72 adds up the products $C_4V4$ and $C_5V5$. The added data $(C_1V1+C_2V2)$ is added to the product $C_3V3$ by the adder element 73. The adder element 74 adds up the output of the adder elements 72 and 73 to generate an output $(C_1V1+C_2V2+C_3V3+C_4V4+C_5V5)$ of the adder 7a. The divider 8a divides the output of the adder 7a by a constant $(C_1+C_2+C_3+C_4+C_5)$ for normalization to generate data $(C_1V1+C_2V2+C_3V3+C_4V4+C_5V5)/(C_1+C_2+C_3+C_4+C_5)$ representing the unsharp signal U. Incidentally, the other weighting units 6b, 10a and 10b shown in FIG. 11 operate in a similar way to the weighting unit 6a. So do the other adders 7b, 7c and 7d, and the other dividers 8b, 8c and 8d.

Figure 13:
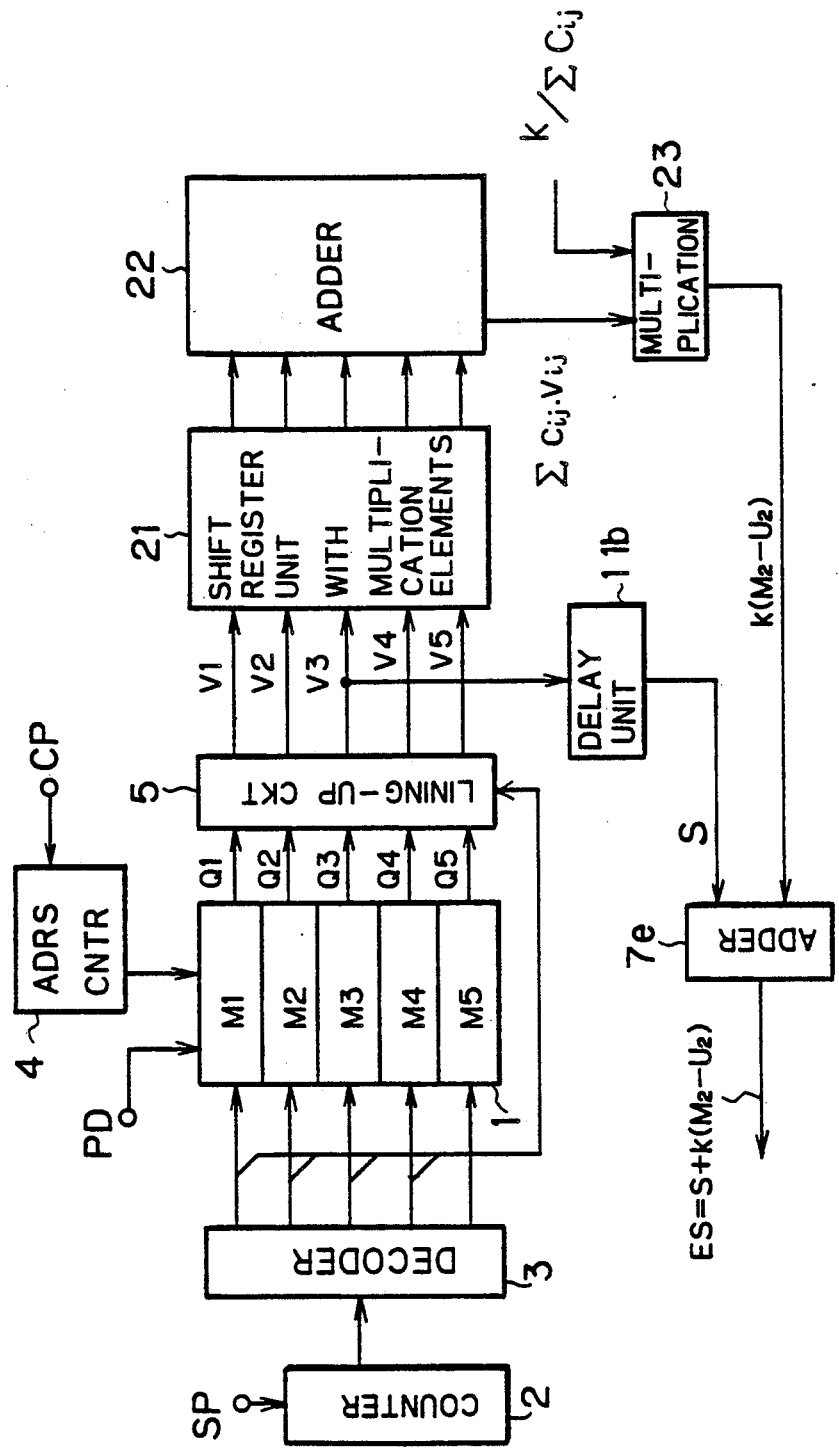
FIGS. 13 and 14 are block diagrams showing a second example of the inner structure of the detail enhancement unit.
Figure 14:
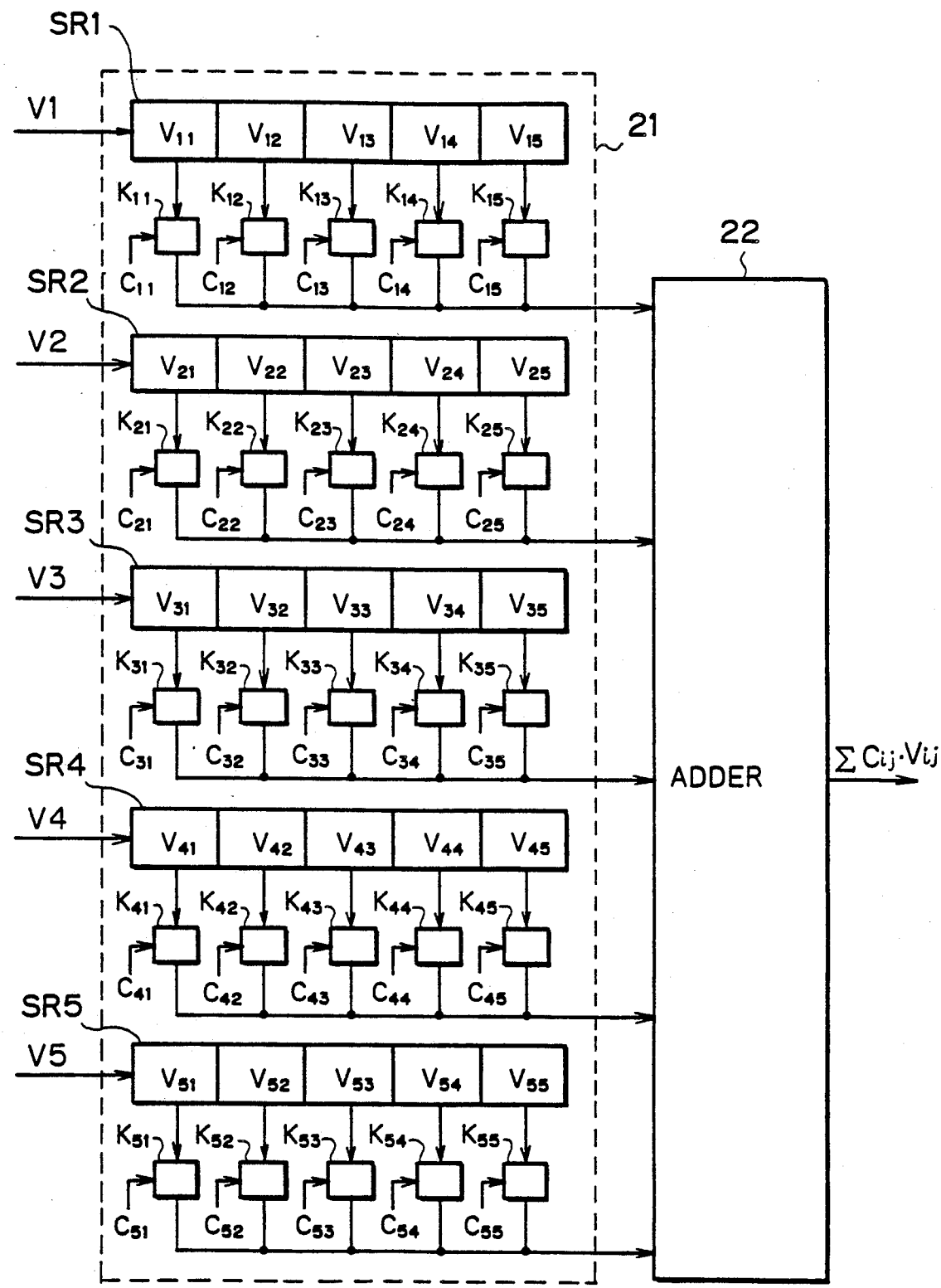

FIG. 13 is a block diagram showing another example of the inner structure of the detail enhancement unit 400 which executes the weighting operation for both the main scanning direction and the subscanning direction at a time. An image memory 1, a counter 2, a decoder 3, an address counter 4 and a lining-up circuit 5 are the same as those shown in FIG. 11. Image data V1–V5 are supplied from the lining-up circuit 5 to a shift register unit 21 including multiplication elements. FIG. 14 is a block diagram showing the internal structure of the shift register 21. The shift register unit 21 comprises five shift register elements SR1–SR5. The shift register element SR1, for example, stores image data V11–V15 for five consecutive pixels in a first main scanning line. The shift register elements SR1–SR5 as a whole store image data $V_{ij}$ (i:1–5, j:1–5) for pixels arrayed in a 5×5 matrix. The shift register unit further comprises multiplication elements $K_{ij}$ (i:1–5, j:1–5). Each multiplication element $K_{ij}$ multiplies the image data $V_{ij}$ by a prescribed constant $C_{ij}$. The products $C_{ij} \cdot V_{ij}$ are added up in an adder 22 to be a weighted data $\Sigma C_{ij} \cdot V_{ij}$. The symbol $\Sigma$ denotes the sum from i equals one to five and from j equals one to five. The constants $C_{ij}$ are weighting factors for a 5×5 pixel matrix.

The data $\Sigma C_{ij} \cdot V_{ij}$ is multiplied by a constant $k/\Sigma C_{ij}$ in a mulitlication unit 23 to be the enhancement signal $k(M_2-U_2)$. The enhancement signal $k(M_2-U_2)$ is added to the sharp signal S supplied from the delay unit 11b in an adder 7e to be the enhanced image signal ES.

The above described digital processing has the following advantage. A color film having dimensions of about 60 mm×60 mm is often used as an original for a color scanner to reproduce color images of various sizes. Since the quality of a reproduced image is usually evaluated at the distance of distinct vision, an area around each pixel where the detail enhancement is performed is decided based on the size of the reproduced image, but not on the size of the original. Therefore, when a magnification factor for magnifying an original image is changed in the analog processing, the radii of the apertures for the sharp, middle and unsharp signals are changed according to the magnification factors; the apertures are replaced with other apertures, or the masks whose aperture radii can be changed are utilized. On the other hand, in the digital processing, the aperture for the sharp signal is not required to be changed; the magnification factor can be changed only by adjusting a sampling pitch in reading an original. The procedure of the digital processing is unchanged even of the magnification factor is changed.

The enhancement image signal ES defined by the following equation has similar effects to those defined by the equations (1) and (2):

$$ES = S + k_1(S-M) + k_2(S-U) + k_3(M-U) \quad (3)$$

Figure 15:
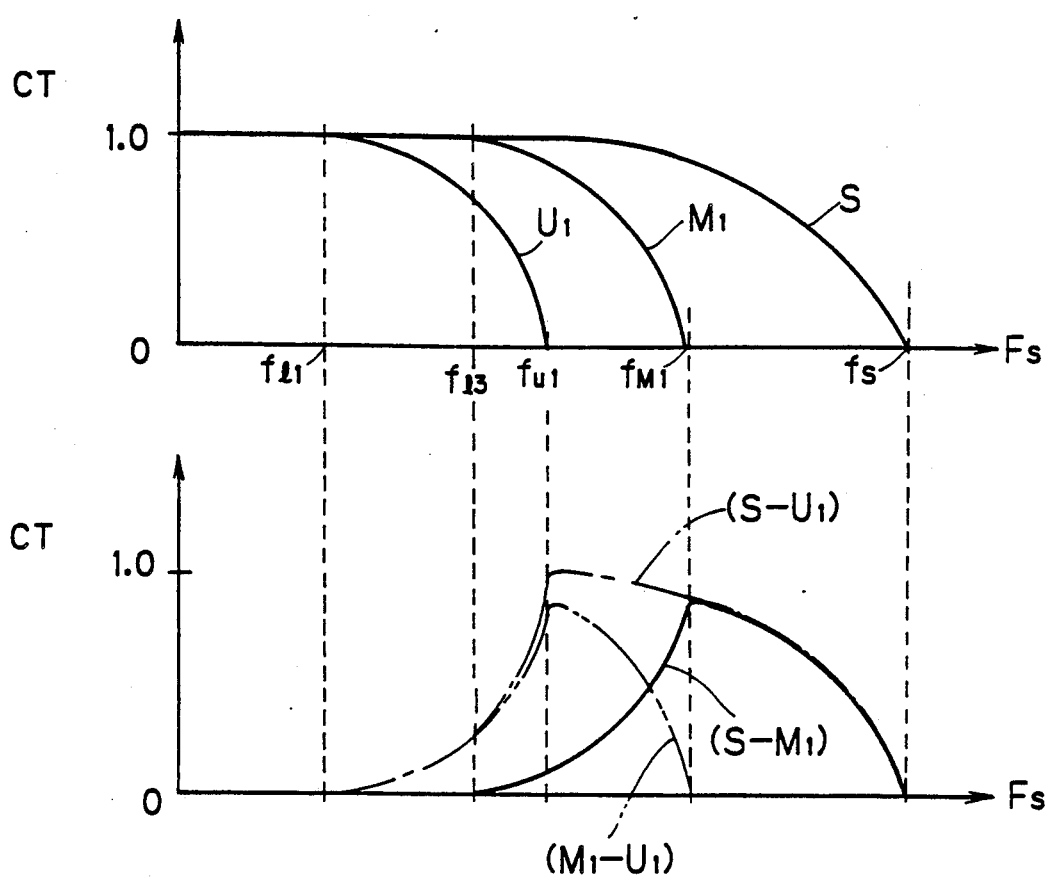
FIG. 15 illustrates MTF characteristics of basic enhancement signals.

FIG. 15 illustrates an example of the contrast ratios of the three basic enhancement signals (S−M), (S−U) and (M−U).

Figure 16A:
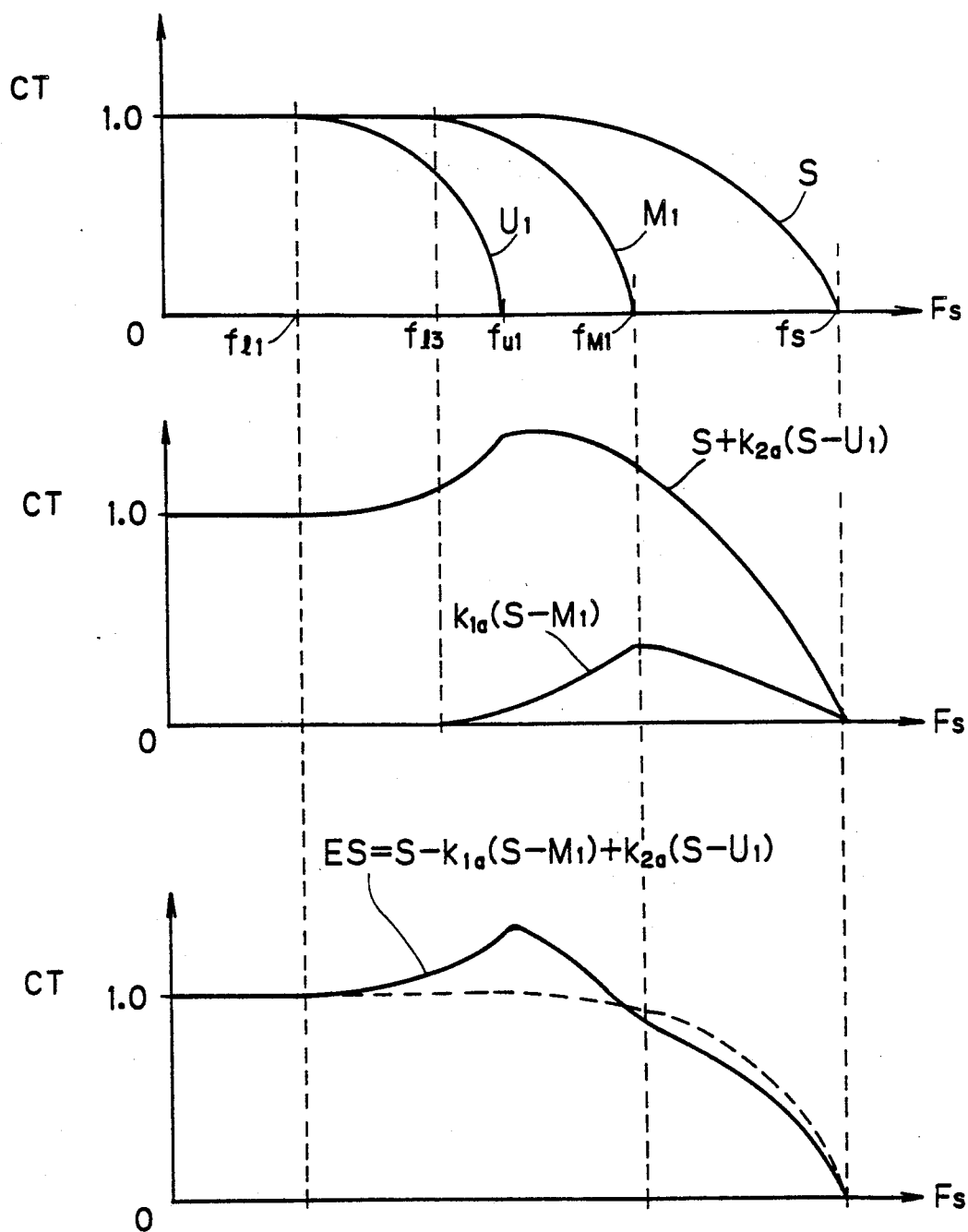
FIGS. 16A through 16C and 17A through 17D illustrate MTF characteristics of enhanced image signals.
Figure 16B:
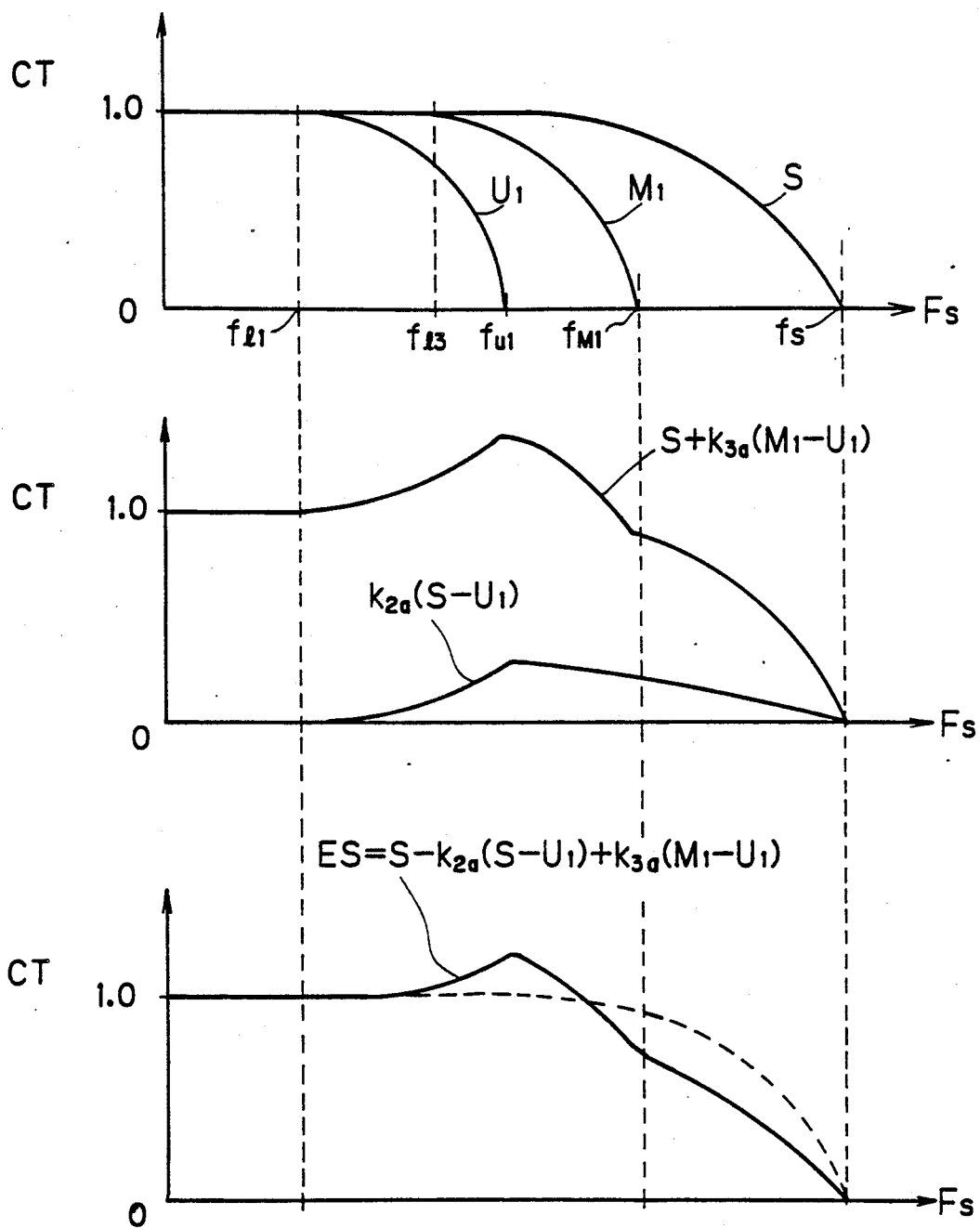
Figure 16C:
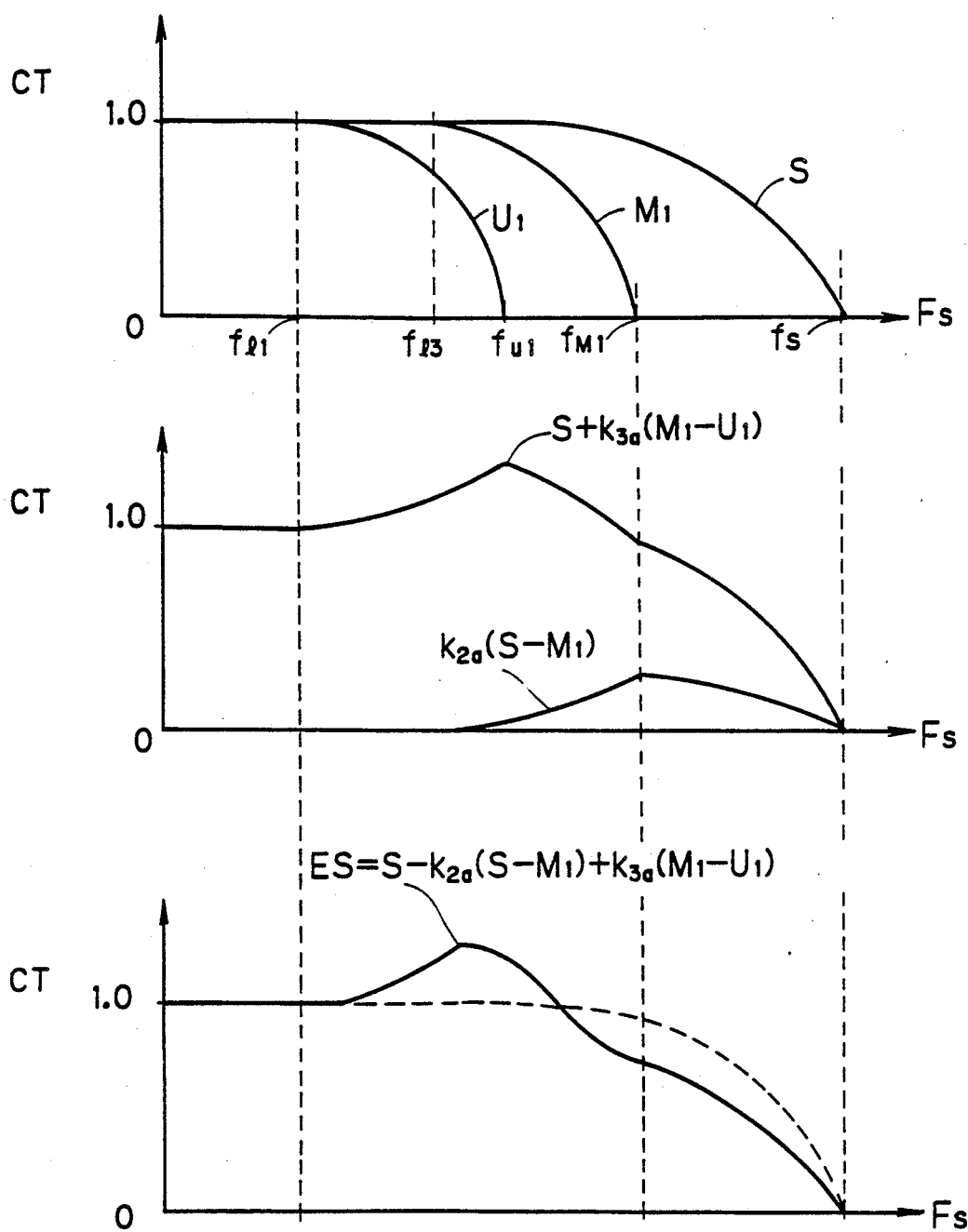
Figure 17A:
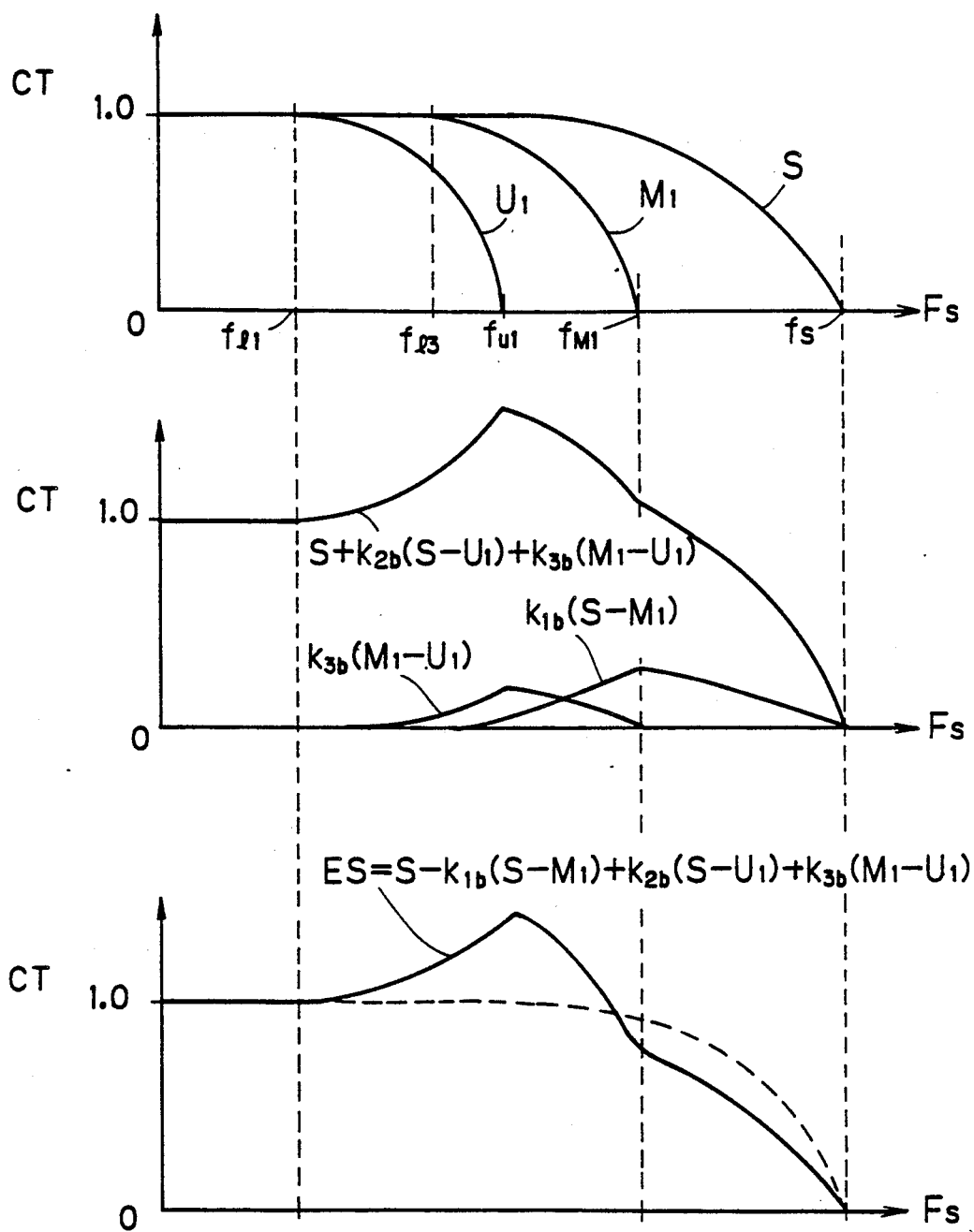
Figure 17B:
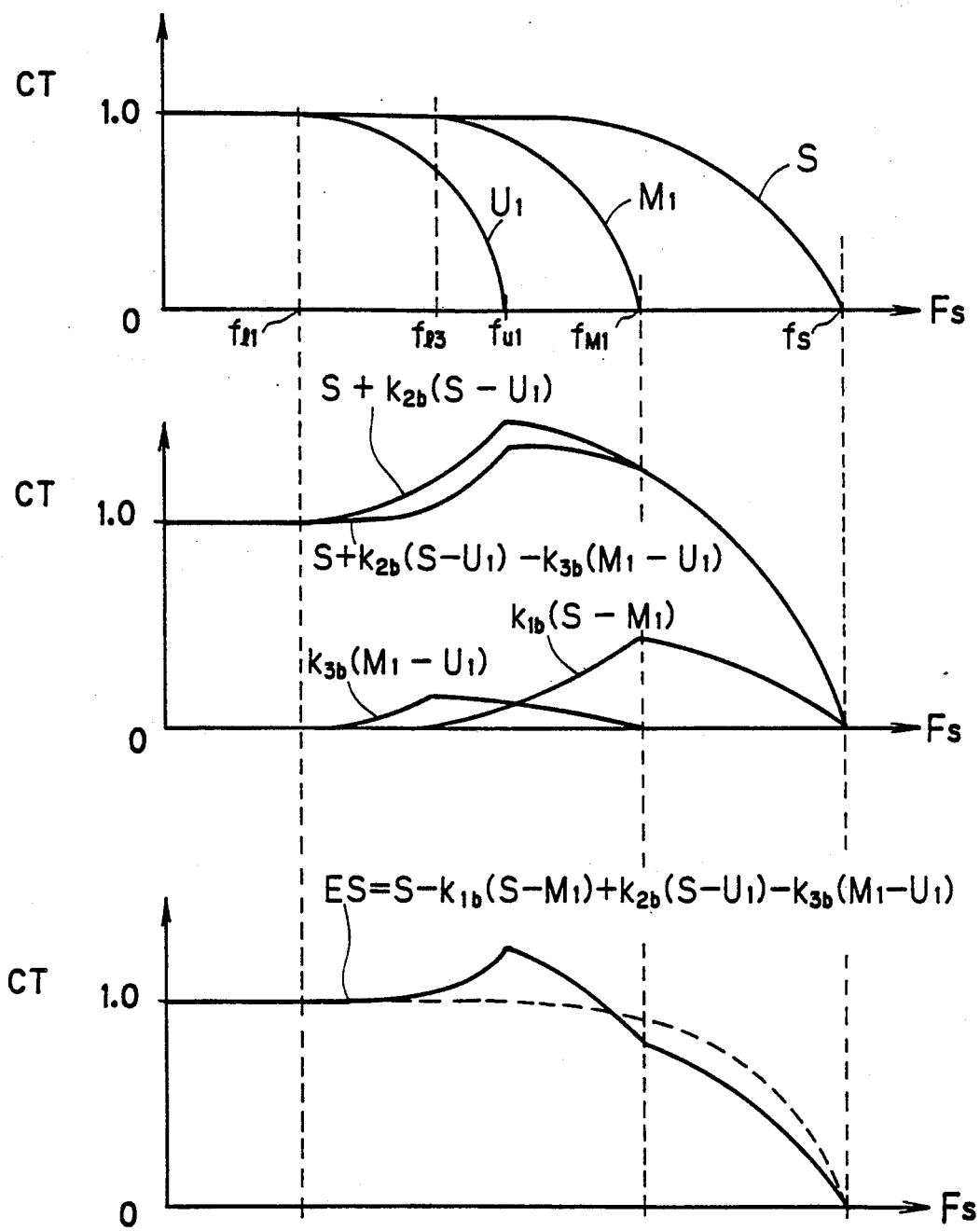
Figure 17C:
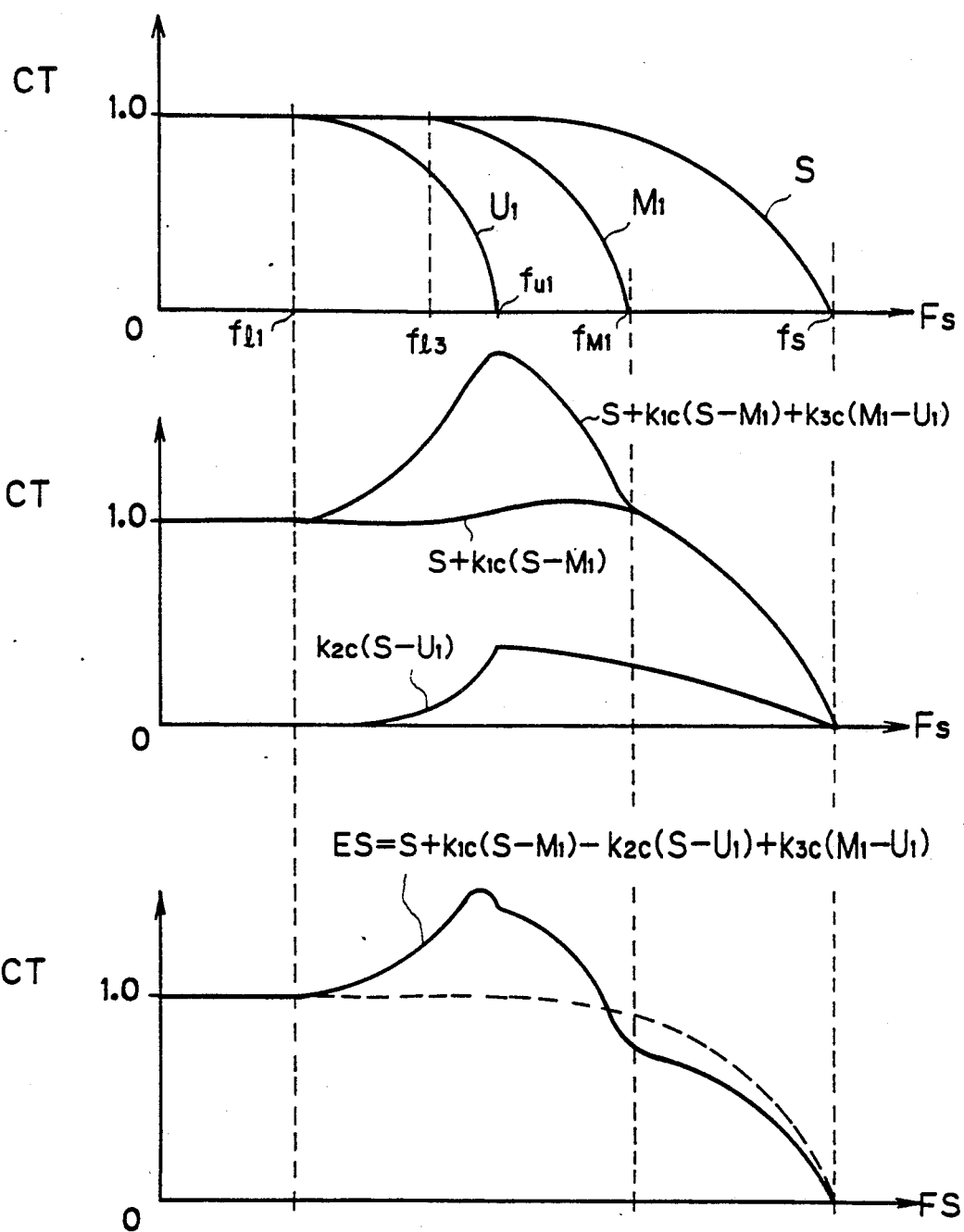
Figure 17D:
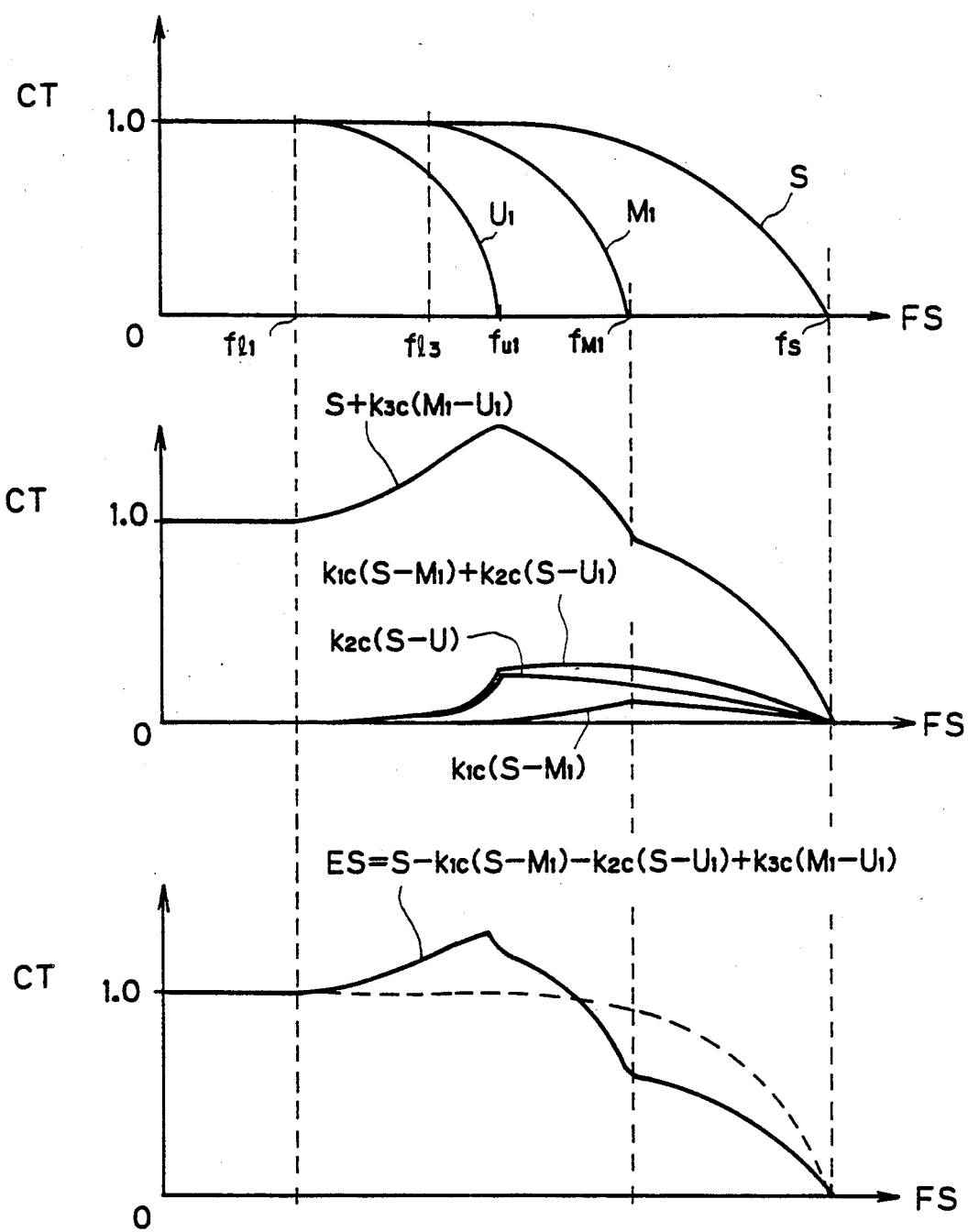

More specifically, the enhanced image signal ES may be defined by the following equations which employ two of the three basic enhancement signals (S−M), (S−U) and (M−U):

$$ES = S - k_{1a}(S-M) + k_{2a}(S-U) \quad (4)$$

$$ES = S - k_{2a}(S-U) + k_{3a}(M-U) \quad (5)$$

$$ES = S - k_{1a}(S-M) + k_{3a}(M-U) \quad (6)$$

where coefficients $k_{1a}$, $k_{2a}$ and $k_{3a}$ have positive values. FIG. 16A through 16C illustrate MTF characteristics of the enhanced image signal ES according to the equations (4) through (6), respectively.

As can be seen in FIG. 15, the basic enhancement signals (S−M) and (S−U) have a higher contrast ratio CT than the other basic enhancement signal (M−U) at the spatial frequency ranging from $f_{M1}$ to $f_S$. This means that the basic enhancement signals (S−M) and (S−U) include higher spatial frequency components than the basic enhancement signal (M−U). Therefore, in the equations (5) and (6), the basic enhancement signal (S−M) or (S−U) including higher spatial frequency components, or its coefficient $k_{1a}$ or $k_{2a}$, has the sign of minus, and the basic enhancement signal (M−U), or its coefficient $k_{3a}$, has the sign of plus; this assignment of the signs decreases the contrast ratio of the enhanced image signal ES at the upper range of spatial frequency between $f_{M1}$ and $f_S$ while increasing that at a middle range of spatial frequency between $f_{l3}$ and $f_{M1}$, as shown in FIGS. 16B and 16C. Consequently, the sharpness of an image is properly enhanced as described before with FIGS. 7A and 7B.

As to the equation (4), the two basic enhancement signals (S−M) and (S−U) have an equal contrast raito CT at the upper range of spatial frequency between $f_{M1}$ and $f_S$. At the middle range of spatial frequency between $f_{l3}$ and $f_{M1}$, the basic enhancement signal (S−U) has a higher contrast ratio than the basic enhancement signal (S−M). Therefore, in order to increase the contrast ratio of the enhanced image signal ES at the middle range of spatial frequency between $f_{l3}$ and $f_{M1}$ and decrease the contrast ratio at the upper range of spatial frequency, the coefficients $k_{1a}$ and $k_{2a}$ have the signs of minus and plus, respectively, and they preferably hold the following relation:

$$k_{2a} < k_{1a} \quad (4a)$$

The enhanced image signal ES can be also defined by the following equations (7)–(10) which employ all of the three basic enhancement signals (S−M), (S−U) and (M−U):

$$ES = S - k_{1b}(S-M) + k_{2b}(S-U) + k_{3b}(M-U) \quad (7)$$

$$ES = S - k_{1b}(S-M) + k_{2b}(S-U) - k_{3b}(M-U) \quad (8)$$

$$ES = S + k_{1c}(S-M) - k_{2c}(S-U) + k_{3c}(M-U) \quad (9)$$

$$ES = S - k_{1c}(S-M) - k_{2c}(S-U) + k_{3c}(M-U) \quad (10)$$

where coefficients $k_{1b}$, $k_{1c}$, $k_{2b}$, $k_{2c}$, $k_{3b}$, and $k_{3c}$ have positive values.

In the equation (7), the coefficients $k_{1b}$ and $k_{2b}$ have preferably hold the following relation (7a):

$$k_{2b} < k_{1b} \quad (7a)$$

In the equation (8), the coefficients $k_{2b}$ and $k_{3b}$ are required to hold the following relation (8a):

$$k_{3b} < k_{2b} \quad (8a)$$

Further, in the equation (8), the coefficients $k_{1b}$ and $k_{2b}$ have preferably hold the following relation (8b):

$$k_{2b} < k_{1b} \quad (8b)$$

In the equation (9), the coefficients $k_{2c}$ and $k_{3c}$ are required to hold the following relation (9a):

$$k_{2c} < k_{3c} \quad (9a)$$

Further, in the equation (9), the coefficients $k_{1c}$ and $k_{2c}$ have preferably hold the following relation (9b):

$$k_{1c} < k_{2c} \quad (9b)$$

In the equation (10), the coefficients $k_{2c}$ and $k_{3c}$ are required to hold the following relation (10a):

$$k_{2c} < k_{3c} \quad (10a)$$

FIGS. 17A through 17D illustrate MTF characteristics of the enhanced image signals ES according to the equations (7) through (10), respectively.

As can be seen by comparing the equations (4), (7) and (8) with each other, the equations (7) and (8) have a fourth term in the right hand side in addition to the three terms in the equation (4). Since the fourth term, $+k_{3b}(M-U)$ or $-k_{3b}(M-U)$, includes the basic enhancement signal $(M-U)$ which has nonezero value of the contrast ratio CT only at a range of spatial frequency lower than $f_{M1}$, the sign of the forth term can be either plus or minus, as expressed in the equations (7) and (9).

The relation between the coefficients $k_{1b}$ and $k_{2b}$ of the expression (7a) is identical to that of the expression (4a). When the relation (7a) is satisfied, the contrast ratio at the upper range of spatial frequency becomes lower than that of the sharp signal S.

When the signal of the forth term is minus, namely in the equation (8), its coefficient $k_{3b}$ is required to be smaller than the coefficient $k_{2b}$, as shown in the relation (8a), in order to maintain the contrast ratio higher than 1.0 at the middle range of the spatial frequency. When the relation (8b) is further satisfied, the contrast ratio at the upper range of spatial frequency becomes lower than that of the sharp signal S.

The equations (9) and (10) have a second term, $+k_{1c}(S-M)$ or $-k_{1c}(S-M)$, concerning the basic enhancement signal $(S-M)$ in the right hand side in addition to the terms in the equation (5). In order to increase the contrast ratio CT at the middle range of spatial frequency, the coefficient $k_{3c}$ is required to be greater than the coefficinet $k_{2c}$, as expressed in the expressions (9a) and (10a). In the equation (9), when the relation (9b) is further saitsfied, the contrast ratio at the upper range of spatial frequency becomes lower than that of the sharp signal S.

Consequently, the enhanced image signal ES according to the equations (7) through (10) represent an image whose detail is well enhanced at the middle range of spatial frequency between $f_{I3}$ and $f_{M1}$ while the enhancement is suppressed at the upper range of spatial frequency between $f_{M1}$ and $f_S$, as shown in FIG. 17A through 17D.

One of those equations (1)–(10) is selected to define the enhanced image signal ES according to characteristics of an original, the purpose of a reproduced image and the like. Since every equation (1)–(10) includes the middle signal M, any of the equations (1)–(10) has a similar effect of the detail enhancement as described before.

Figure 18A:
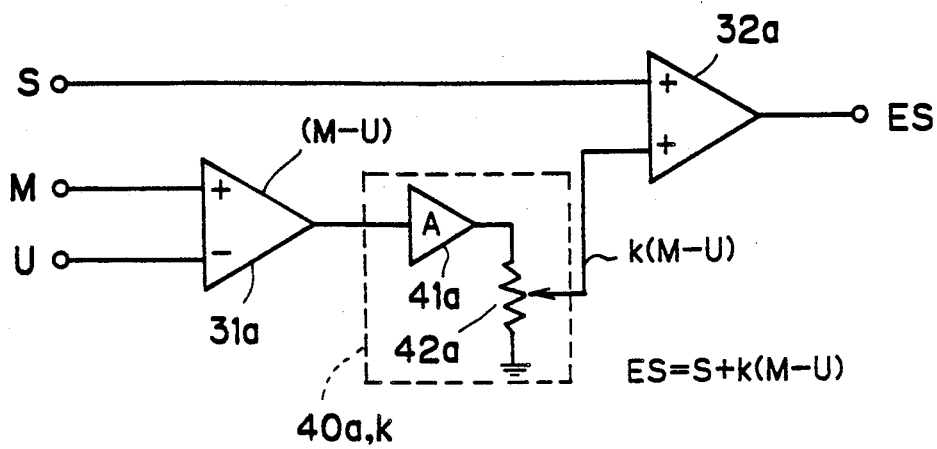
FIGS. 18A through 18C are block diagrams showing analog circuits as the inner structure of the detail enhancement unit.
Figure 18B:
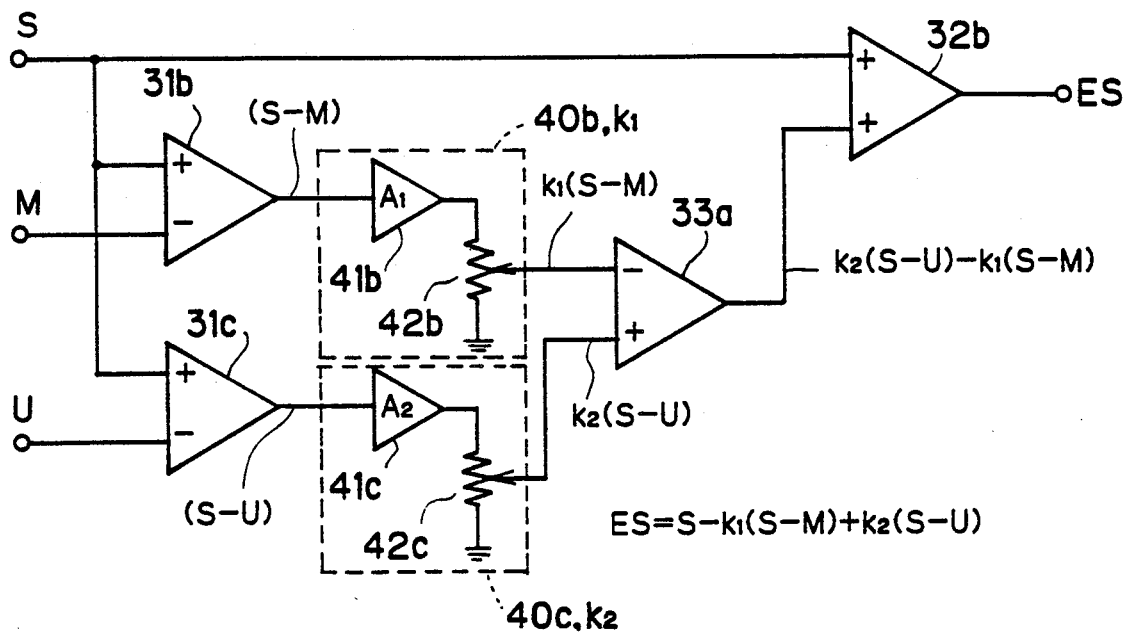
Figure 18C:
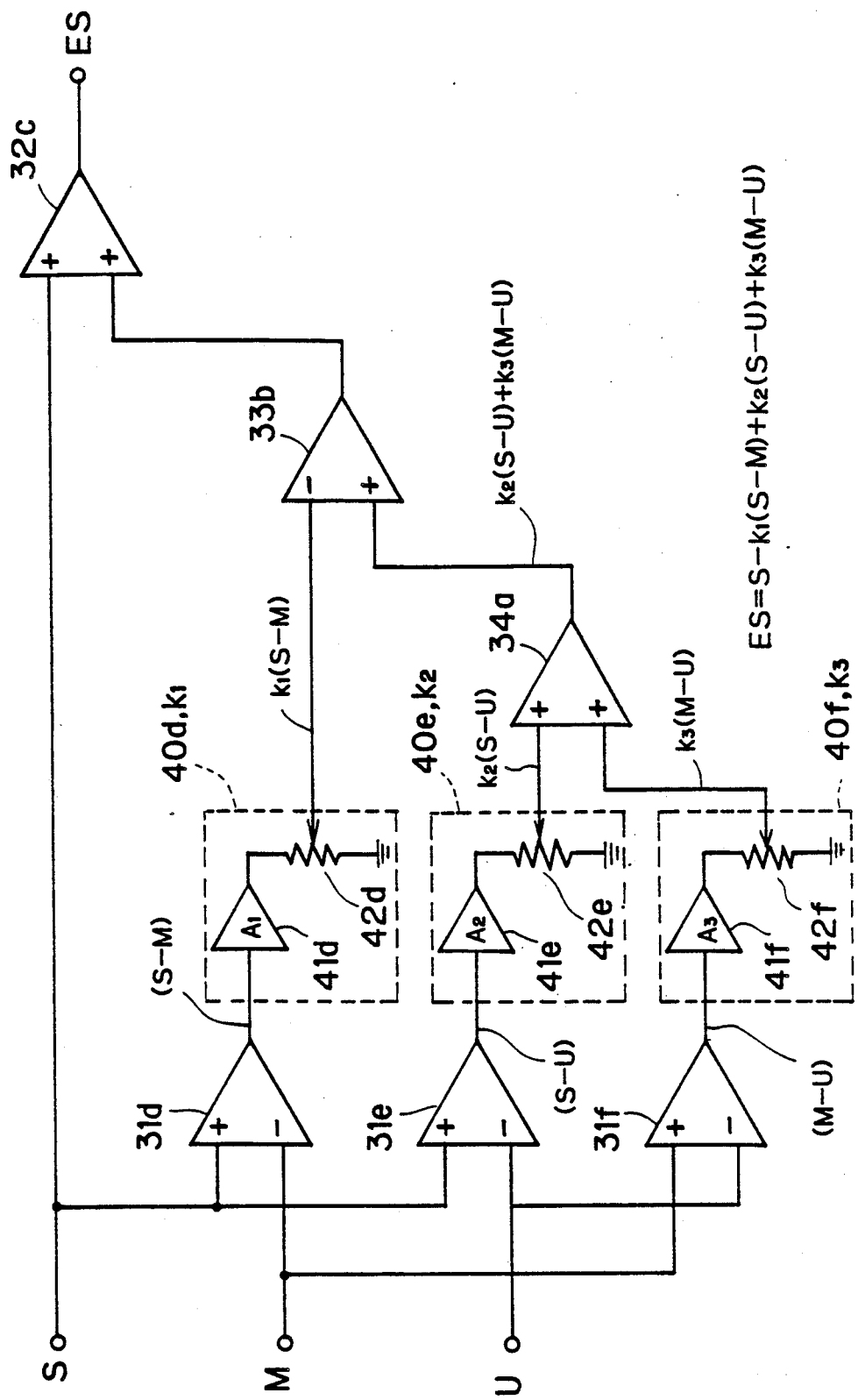

FIGS. 18A through 18C are block diagrmas showing the structure of analog circuits for generating the enhanced image signal ES on the basis of the analog signals S, M and U shown in FIG. 4A.

The circuit shown in FIG. 18A generates the enhanced image signal ES according to the equation (1). A substracter 31a subtracts the unsharp signal U from the middle signal M to generate the basic enhancement signal $(M-U)$. The basic enhancement signal $(M-U)$ is multiplied by a coefficient k in a multiplication unit 40a, which consists of a non-inverting amplifier 41a and a variable resistor 42a. The coefficient k can be varied by varying the resistance of the variable resistor 42a. For example, when the amplitude A of the non-inverting amplifier 41a is 2.0 and when the variable resistor 42a can change the level of its output signal $k(M-U)$ between 0 and 1.0 volt, the coefficient k can be varied between 0 an 2.0, namely, $0 \leq k \leq 2.0$. An adder 32a adds the sharp signal S and the output signal $k(M-U)$ of the multiplication unit 40a, thereby generating the enhanced image signal ES.

The circuit shown in FIG. 18B generates the enhanced image signal ES according to the equation (2) or (4). Subtracters 31b and 31c generate the basic enhancement signals $(S-M)$ and $(S-U)$. Multiplication units 40b and 41c, which consist of non-inverting amplifiers 41b and 40c and variable resistors 42b and 42c, respetivly, muliply the basic enhancement signals $(S-M)$ and $(S-U)$ by coefficients $k_1$ and $k_2$, respectively. These coefficients $k_1$ and $k_2$ can be varied by varying the resistance of the variable resistors 42b and 42c, respectively. Another subtracter 33a subtracts an output signal $k_1(S-M)$ of the multiplication unit 40b from an output signal $k_2(S-U)$ of the multiplication unit 40c. An adder finally adds the sharp signal S and the output signal of the subtractor 33a, thereby generating the enhanced image signal ES.

The circuit shown in FIG. 18C generates the enhanced image signal ES according to the equation (7). Subtracters 31d through 31f generates the basic enhancement signals $(S-M)$, $(S-U)$ and $(M-U)$, respectively. Multiplication units 40d through 40f, which consist of non-inverting amplifiers 41d through 41f and variable resistors 42d through 42f, respectively, multiply the basic enhancement signals $(S-M)$, $(S-U)$ and $(M-U)$ by coefficients $k_1$, $k_2$ and $k_3$, respectively. These coefficients $k_1$ through $k_3$ can be also varied by varying the resistance of the variable resistors 42d through 42f, respectively. An adder 34a adds the output signals $k_2(S-U)$ and $k_3(M-U)$ of the multiplication units 40e and 40f. Another subtracter 33b subtracts an output signal $k_1(S-M)$ of the multiplication unit 40d from an output signal of the adder 34a. Another adder 32c finally adds the sharp signal S and an output singnal of the subtracter 33b, thereby generating the enhanced image signal ES.

The present invention can be applied not only to a color scanner of the drum type, which includes a reading scanner unit comprising a revolving drum, a light source and an optical reading system, but also to a monochrome scanner, facsimile terminal equipment and another apparatus which includes a laser scanning/reading unit of a flat bed type or a reading unit employing a video camera with a camera tube or a solid-state imaging device.

Further, the present invention can be applied not only to new image data just obtained by reading an original, but also to image data subjected to processing such as color correction, magnification and the like, image data stored in or transmitted from some device and image data to be used for reproducing or recording an image. The present invention can be applied to a color image as well as a monochrome image.

According to the present invention, detail in an image is enhanced while the detail enhancement at a relatively upper range of spatial frequency is suppressed to prevent the granular noise form being enhanced, and while considerably enhanced is the image signal at the middle frequency range which is important to improve sharpness of a reproduced image to be seen with the naked eye.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. A method of enhancing detail in an image by producing an enhanced image signal representing said image with said detail enhanced, comprising the steps of:
    (a) scanning an original with respect to each pixel to produce a sharp signal representing density of each pixel, a middle signal representing weighted mean density of a first area about each pixel with a first weighting factor, and an unsharp signal representing weighted mean density of a second area about each pixel with a second weighting factor, said first area being larger than a pixel, said second area being still larger than said first area,
    (b) obtaining a differential signal between said middle signal and said unsharp signal to produce a basic enhancement signal,
    (c) multiplying said basic enhancement signal by a coefficient to produce an enhancement signal, and
    (e) adding said sharp signal and said enhancement signal to produce said enhanced image signal.

2. A method in accordance with claim 1, wherein said basic enhancement signal is produced by subtracting said unsharp signal from said middle signal, and said coefficient has a plus sign.

3. A method of enhancing detail in an image by producing an enhanced image signal representing said image with said detail enhanced, comprising the steps of:
    (a) scanning an original with respect to each pixel to produce a sharp signal representing density of each pixel, a middle signal representing weighted mean density of a first area about each pixel with a first weighting factor, and an unsharp signal representing weighted mean density of a second area about each pixel with a second weighting factor, said first area being larger than a pixel, said second area being still larger than said first area,
    (b) producing two out of first through third basic enhancement signals, where said first basic enhancement signal is to be produced by subtracting said middle signal from said sharp signal, said second basic enhancement signal is to be produced by subtracting said unsharp signal from said sharp signal, and said third basic enhancement signal is to be produced by subtracting said unsharp signal from said middle signal,
    (c) multiplying the two basic enhancement signals produced at said step (b) by respective coefficients, said coefficients having opposite signs to each other, one of said coefficients for one of said two basic enhancement signals which includes higher spatial frequency components than the other basic enhancement signal having a minus sign, to thereby produce two enhancement signals, and
    (d) adding said sharp signal and said two enhancement signals to produce said enhanced image signal.

4. A method in accordance with claim 3, wherein said two basic enhancement signal produced at said step (b) consist of said first and second basic enhancement signals, and said coefficients for said first and second basic enhancement signals have minus and plus signs, respectively.

5. A method in accordance with claim 3, wherein said two basic enhancement signal produced at said step (b) consist of said second an third basic enhancement signals, and said coefficients for said second and third basic enhancement signals have minus and plus signs, respectively.

6. A method in accordance with claim 3, wherein said two basic enhancement signal produced at said step (b) consist of said first and third basic enhancement signals, and said coefficients for said first and third basic enhancement signals have minus and plus signs, respectively.

7. A method of enhancing detail in an image by producing an enhanced image signal representing said image with said detail enhanced, comprising the steps of:
    (a) scanning an original with respect to each pixel to produce a sharp signal representing density of each pixel, a middle signal representing weighted mean density of a first area about each pixel with a first weighting factor, and an unsharp signal representing weighted mean density of a second area about each pixel with a second weighting factor, said first area being larger than a pixel, said second area being still larger than said first area,
    (b) subtracting said middle signal from said sharp signal to produce a first basic enhancement signal,
    (c) subtracting said unsharp signal from said sharp signal to produce a second basic enhancement signal,
    (d) subtracting said unsharp signal from said middle signal to produce a third basic enhancement signal, (e) multiplying said first, second and third basic enhancement signals by respective first, second and third coefficients to produce first, second and third enhancement signals, respectively, and (f) adding said sharp signal and said first, second and third enhancement signals to produce said enhanced image signal.

8. A method in accordance with claim 7, wherein said first and second coefficients have minus and plus signs, respectively.

9. A method in accordance with claim 8, wherein said third coefficient has a plus sign.

10. A method in accordance with claim 9, wherein an absolute value of first coefficient is greater than an absolute value of said second coefficient.

11. A method in accordance with claim 8, wherein said third coefficient has a minus sign and an absolute value of said third coefficient is smaller than said absolute value of said second coefficient.

12. A method in accordance with claim 11, wherein an absolute value of first coefficient is greater than an absolute value of said second coefficient.

13. A method in accordance with claim 7, wherein said second and third coefficients have minus and plus signs, respectively.

14. A method in accordance with claim 13, wherein said first coefficient has a plus sign, and an absolute value of said third coefficient is greater than an absolute value of said second coefficient.

15. A method in accordance with claim 14, wherein an absolute value of second coefficient is greater than an absolute value of said first coefficient.

16. A method in accordance with claim 13, wherein said first coefficient has a minus sign and an absolute value of said second coefficient is smaller than said absolute value of said third coefficient.

17. An apparatus for enhancing detail in an image by producing an enhanced image signal representing said image with said detail enhanced, comprising:

(a) means for scanning an original with respect to each pixel to produce a sharp signal representing density of each pixel, a middle signal representing weighted mean density of a first area about each pixel with a first weighting factor, and an unsharp signal representing weighted mean density of a second area about each pixel with a second weighting factor, said first area being larger than a pixel, said second area being still larger than said first area, (b) subtracter means for obtaining differential signal between said middle signal and said unsharp signal to produce a basic enhancement signal, (c) multiplication means for multiplying said basic enhancement signal by a coefficient to produce an enhancement signal, and (e) adding said sharp signal and said enhancement signal to produce said enhanced image signal.

18. An apparatus in accordance with claim 17, wherein
said subtracter means subtracts said unsharp signal from said middle signal, and said coefficient has a plus sign.

19. An apparatus in accordance with claim 18, wherein
said coefficient is variable in said multiplication means.

20. An apparatus for enhancing detail in an image by producing an enhanced image signal representing said image with said detail enhanced, comprising the steps of:

(a) means for scanning an original with respect to each pixel to produce a sharp signal representing density of each pixel, a middle signal representing weighted mean density of a first area about each pixel with a first weighting factor, and an unsharp signal representing weighted mean density of a second area about each pixel with a second weighting factor, said first area being larger than a pixel, said second area being still larger than said first area, (b) means for producing two out of first to third basic enhancement signals, where said first basic enhancement signal is to be produced by subtracting said middle signal from said sharp signal, said second basic enhancement signal is to be produced by subtracting said unsharp signal from said sharp signal, and said third basic enhancement signal is to be produced by subtracting said unsharp signal from said middle signal, (c) multiplication means for multiplying two basic enhancement signals produced at said step (b) by respective coefficients, said coefficients having opposite signs to each other, one of said coefficients for one of said two basic enhancement signals which includes higher spatial frequency components than the other basic enhancement signal having a minus sign, to thereby produce two enhancement signals, and (d) means for adding said sharp signal and said two enhancement signals to produce said enhanced image signal.

21. An apparatus in accordance with claim 20, wherein
said two basic enhancement signal produced in means (b) consist of said first and second basic enhancement signals, and said coefficients for said first and second basic enhancement signals have minus and plus signs, respectively.

22. An apparatus in accordance with claim 21, wherein
said coefficients are variable in said multiplication means.

23. An apparatus in accordance with claim 20, wherein
said two basic enhancement signal produced in said means (b) consist of said second an third basic enhancement signals, and said coefficients for said second and third basic enhancement signals have minus and plus signs, respectively.

24. An apparatus in accordance with claim 23, wherein
said coefficients are variable in said multiplication means.

25. An apparatus in accordance with claim 20, wherein
said two basic enhancement signal produced in said means (b) consist of said first an third basic enhancement signals, and said coefficients for said first and third basic enhancement signals have minus and plus signs, respectively.

26. An apparatus in accordance with claim 25, wherein
said coefficients are variable in said multiplication means.

27. An apparatus for enhancing detail in an image by producing an enhanced image signal representing said image with said detail enhanced, comprising:
  (a) means for scanning an original with respect to each pixel to produce a sharp signal representing density of each pixel, a middle signal representing weighted mean density of a first area about each pixel with a first weighting factor, and an unsharp signal representing weighted mean density of a second area about each pixel with a second weighting factor, said first area being larger than a pixel, said second area being still larger than said first area,
  (b) means for subtracting said middle signal from said sharp signal to produce a first basic enhancement signal,
  (c) means for subtracting said unsharp signal from said sharp signal to produce a second basic enhancement signal,
  (d) means for subtracting said unsharp signal from said middle signal to produce a third basic enhancement signal,
  (e) multiplication means for multiplying said first, second and third basic enhancement signals by respective first, second and third coefficients to produce first, second and third enhancement signals, respectively, and
  (f) means for adding said sharp signal and said first, second and third enhancement signals to produce said enhanced image signal.

28. An apparatus in accordance with claim 27, wherein
said first and second coefficients have minus and plus signs, respectively.

29. An apparatus in accordance with claim 28, wherein
said third coefficient has a plus sign.

30. An apparatus in accordance with claim 29, wherein
an absolute value of first coefficient is greater than an absolute value of said second coefficient.

31. An apparatus in accordance with claim 28, wherein
said third coefficient has a minus sign and an absolute value of said third coefficient is smaller than said absolute value of said second coefficient.

32. An apparatus in accordance with claim 31, wherein
an absolute value of first coefficient is greater than an absolute value of said second coefficient.

33. An apparatus in accordance with claim 32, wherein
said first to third coefficients are variable in said multiplication means.

34. An apparatus in accordance with claim 27, wherein
said second and third coefficients have minus and plus signs, respectively.

35. An apparatus in accordance with claim 34, wherein
said first coefficient has a plus sign, and an absolute value of said third coefficient is greater than an absolute value of said second coefficient.

36. An apparatus in accordance with claim 35, wherein
an absolute value of second coefficient is greater than an absolute value of said first coefficient.

37. An apparatus in accordance with claim 34, wherein
said first coefficient has a minus sign and an absolute value of said second coefficient is smaller than said absolute value of said third coefficient.

38. An apparatus in accordance with claim 37, wherein
said first to third coefficients are variable in said multiplication means.

* * * * *